United States Patent
Varki et al.

(10) Patent No.: US 9,647,949 B2
(45) Date of Patent: May 9, 2017

(54) SYSTEMS AND METHODS FOR NETWORK TRANSMISSION OF BIG DATA

(71) Applicant: University of New Hampshire, Durham, NH (US)

(72) Inventors: Elizabeth Varki, Lee, NH (US); Adam Villa, Abington, MA (US)

(73) Assignee: University of New Hampshire, Durham, NH (US)

( * ) Notice: Subject to any disclaimer, the term of this patent is extended or adjusted under 35 U.S.C. 154(b) by 908 days.

(21) Appl. No.: 13/925,029

(22) Filed: Jun. 24, 2013

(65) Prior Publication Data

US 2013/0346578 A1 Dec. 26, 2013

Related U.S. Application Data

(60) Provisional application No. 61/663,185, filed on Jun. 22, 2012.

(51) Int. Cl.
| | | |
|---|---|---|
| *H04L 12/841* | (2013.01) | |
| *H04L 12/729* | (2013.01) | |
| *H04L 12/727* | (2013.01) | |

(52) U.S. Cl.
CPC ............ *H04L 47/28* (2013.01); *H04L 45/121* (2013.01); *H04L 45/125* (2013.01)

(58) Field of Classification Search
CPC ............................... H04L 47/28; H04L 12/841
USPC ........ 709/223, 224, 226, 227, 225, 222, 228
See application file for complete search history.

(56) References Cited

U.S. PATENT DOCUMENTS

| | | | | |
|---|---|---|---|---|
| 7,707,308 | B1* | 4/2010 | Hogge, Jr. | H04L 12/5895 709/218 |
| 9,125,152 | B2* | 9/2015 | Zhu | H04W 52/0229 |
| 2002/0141343 | A1* | 10/2002 | Bays | H04L 41/0893 370/235 |
| 2003/0151619 | A1* | 8/2003 | McBride | H04L 41/145 715/736 |
| 2003/0227877 | A1* | 12/2003 | Kar | H04L 45/08 370/252 |
| 2005/0227615 | A1* | 10/2005 | Sakoda | H04W 48/08 455/7 |
| 2007/0218938 | A1* | 9/2007 | Carter | H04W 52/0251 455/528 |

(Continued)

OTHER PUBLICATIONS

"Optimal Sleep/Wake Scheduling for Time-Synchronized Sensor Networks with QoS Guarantees"—Wu et al, Ohio State University, Mar. 2010 http://www2.ece.ohio-state.edu/~shroff/journal/WFSToN-09a.pdf.*

(Continued)

*Primary Examiner* — Randy Scott
(74) *Attorney, Agent, or Firm* — Finch & Maloney PLLC

(57) ABSTRACT

Systems and methods are described herein for providing one or more data transfer parameters. A network map of a network is stored, and input data regarding a desired data transfer is received. The input data includes a sender identifier associated with a sender node in the network, a receiver identifier associated with a receiver node in the network, and a performance metric. A time for initiating the desired data transfer is determined based on the network map, the sender identifier, the receiver identifier, and the performance metric, and the determined time is provided as a recommendation for initiating the data transfer.

34 Claims, 32 Drawing Sheets

(56) References Cited

U.S. PATENT DOCUMENTS

2010/0223359 A1* 9/2010 Runstedler ............. H04W 4/08
709/219
2012/0284108 A1* 11/2012 Fontana ................. G06Q 50/01
705/14.27

OTHER PUBLICATIONS

Villa and Varki, "Characterization of a campus Internet workload," 27th International Conference on Computers and their Applications (CATA), Mar. 2012.
Villa and Varki, "Performance evaluation of big data transmission models," CMG (Computer Measurement Group), Dec. 2013.
Villa and Varki, "The feasibility of moving terabyte files between campus and cloud," Article in Proceedings of the IASTED International Conference on Parallel and Distributed Computing and Systems, Dec. 2011.

* cited by examiner

| Time | Utilization (%) | SendBW/RecvBW |
|---|---|---|
| 12PM-12AM | 95% | 15 Mbps |
| 12AM-1AM | 50% | 500 Mbps |
| 1AM-2AM | 25% | 750 Mbps |
| 2AM-10AM | <10% | 1 Gbps |
| 10AM-11AM | 25% | 750 Mbps |
| 11AM-12PM | 50% | 500 Mbps |

SYSTEMS AND METHODS FOR NETWORK TRANSMISSION OF BIG DATA

CROSS REFERENCE TO RELATED APPLICATION

This disclosure claims the benefit under 35 U.S.C. §119 (e) of U.S. Provisional Application No. 61/663,185, filed on Jun. 22, 2012, which is incorporated herein by reference in its entirety.

FIELD

In general, the systems and methods described herein relate to network transmission of data.

BACKGROUND

Transmission of data in a network is routine and efficient for small files (i.e., less than 1 GB). However, transmission of larger files often results in delays and/or failed transmissions, giving rise to performance problems. In the end-to-end approach to data transfers, the sender and the receiver initiate a connection and data immediately begins to transfer. The routing pathway is automatically selected by the routers of internet service providers and transit network providers. Standard approaches to data transmission are inadequate for transmitting large files, which require large bandwidth. One way of gaining bandwidth is to use parallel transmissions by opening multiple transmission links between a sender and a receiver. Using parallel transmissions is effective when large bandwidth is available, but sometimes networks can become congested and are unable to keep up with bandwidth demands.

SUMMARY

Accordingly, the systems and methods described herein include, among other things, determining one or more parameters related to transmission of data over a network. According to one implementation of the disclosure, a method is provided for recommending a time to initiate a data transfer. The method comprises storing a network map of a network and receiving input data regarding a desired data transfer, the input data including a sender identifier associated with a sender node in the network, a receiver identifier associated with a receiver node in the network, and a performance metric. The method further comprises determining, using the network map, the sender identifier, the receiver identifier, and the performance metric, a time for initiating the desired data transfer, and providing the determined time as a recommendation for initiating the data transfer.

The determining step of the method comprises identifying a network path between the sender node and the receiver node and an availability profile of one or more intermediate nodes in the network path, the availability profile including a predicted bandwidth availability of the respective intermediate node as a function of time. In some implementations, the determining further comprises identifying a first time associated with a first bandwidth availability in the availability profile, identifying a second time associated with a second bandwidth availability larger than the first bandwidth availability, and selecting the second time.

The method further comprises identifying a plurality of network paths between the sender node and the receiver node and recommending one of the plurality of network paths for the data transfer. The one of the plurality of network paths includes at least one intermediate node for receiving data originating from the sender node, storing the data for a specified amount of time, and transmitting the data towards the receiver node. In some implementations, the performance metric is used to evaluate the plurality of network paths to obtain a score associated with each network path in the plurality of network paths, wherein the one of the plurality of network paths is associated with a score that exceeds a threshold.

The determining is further based on the time zone of the sender node, the time zone of the receiver node, and a time difference between the sender node and the receiver node.

The determining the time for initiating the desired data transfer may comprise evaluating, according to the performance metric, a plurality of candidate initiate times to obtain a score associated with each candidate initiate time in the plurality of candidate initiate times, and selecting a candidate initiate time that is associated with a score that exceeds a threshold. In some implementations, the score is determined from network availability profiles of the sender node, the receiver node, and a plurality of intermediate nodes that are on network paths between the sender node and the receiver node.

The performance metric may correspond to an amount of active transfer time, an amount of end-to-end transfer time, or an amount of bandwidth availability, and the input data further includes a size of the desired data transfer.

The determining step of the methods described above may comprise defining a bounded version of the network and solving, using the bounded version of the network, an objective function of a flow network representative of one or more network paths between the sender node and the receiver node.

According to another implementation of the disclosure, a system is provided for recommending a time to initiate a data transfer. The system comprises a database configured to store a network map of a network, a user interface, and a processor. The user interface is configured to receive input data regarding a desired data transfer, the input data including a sender identifier associated with a sender node in the network, a receiver identifier associated with a receiver node in the network, and a performance metric and provide a time as a recommendation for initiating the data transfer. Additionally, the user interface may provide identifiers or the sites for the storage nodes that are recommended to participate in the data transfer. The processor is configured to determine, using the network map, the sender identifier, the receiver identifier, and the performance metric, the time for initiating the desired data transfer. The processor may further determine the time zone or locations of any intermediate storage nodes for temporarily storing the data involved in the data transfer.

The processor determines the time by identifying a network path between the sender node and the receiver node and an availability profile of one or more intermediate nodes in the network path, the availability profile including a predicted bandwidth availability of the respective intermediate node as a function of time. In some implementations, the processor determines the time by identifying a first time associated with a first bandwidth availability in the availability profile, identifying a second time associated with a second bandwidth availability larger than the first bandwidth availability, and selecting the second time.

The processor is further configured to identify a plurality of network paths between the sender node and the receiver node, and provide as a recommendation one of the plurality of network paths for the data transfer. The one of the plurality of network paths may include at least one intermediate node for receiving data originating from the sender node, storing the data for a specified amount of time, and transmitting the data towards the receiver node. In some implementations, the processor is further configured to evaluate, according to the performance metric, the plurality of network paths to obtain a score associated with each network path in the plurality of network paths, wherein the one of the plurality of network paths is associated with a score that exceeds a threshold.

The processor determines the time based on the time zone of the sender node, the time zone of the receiver node, and a time difference between the sender node and the receiver node.

The processor determines the time by evaluating, according to the performance metric, a plurality of candidate initiate times to obtain a score associated with each candidate initiate time in the plurality of candidate initiate times and selecting a candidate initiate time that is associated with a score that exceeds a threshold. In some implementations, the processor determines the score from network availability profiles of the sender node, the receiver node, and a plurality of intermediate nodes that are on network paths between the sender node and the receiver node.

The performance metric may correspond to an amount of active transfer time, an amount of end-to-end transfer time, or an amount of bandwidth availability, and the input data further includes a size of the desired data transfer.

The processor may determine the time by defining a bounded version of the network and solving, using the bounded version of the network, an objective function of a flow network representative of one or more network paths between the sender node and the receiver node.

According to another implementation of the disclosure, a method is provided for recommending a network path for a data transfer. The method comprises storing a network map of a network and receiving input data regarding a desired data transfer, the input data including a sender identifier associated with a sender node in the network, a receiver identifier associated with a receiver node in the network, a size of the desired data transfer, and a performance metric. The method further comprises identifying, using the network map, a plurality of candidate network paths between the sender node and the receiver node, each of the candidate network paths possibly including at least one intermediate node for receiving data originating from the sender node and transmitting the data towards the receiver node. In some implementations, when the sender node is located near the receiver node (in the same time zone, for example), then an intermediate storage node may not be required, and a candidate network path may include only the sender node and the receiver node. The performance metric is used to assess a score associated with each of the candidate network paths in the plurality of candidate network paths. When one of the candidate network paths is associated with a score that exceeds a threshold, the one of the candidate network paths is selected.

In some implementations, a first candidate network path is associated with a first score representative of a first amount of transfer time, and a second candidate network path is associated with a second score representative of a second amount of transfer time. The first score is higher than the second score when the first amount of transfer time is shorter than the second amount of transfer time. In some implementations, the performance metric corresponds to an amount of active transfer time, an amount of end-to-end transfer time, or a combination of both an amount of active transfer time and an amount of end-to-end transfer time.

According to another implementation of the disclosure, a method is provided for assessing an amount of transferable data between two nodes. The method comprises storing a network map of a network and receiving input data regarding a desired data transfer, the input data including a sender identifier associated with a sender node in the network, a receiver identifier associated with a receiver node in the network, and a time interval. The method further comprises identifying, using the network map, a plurality of network paths between the sender node and the receiver node, each of the network paths including at least one intermediate node for receiving data originating from the sender node and transmitting the data towards the receiver node. In some implementations, one or more of the network paths do not include any intermediate nodes and include only the sender node and the receiver node. For a respective network path in the plurality of network paths, an amount of data that can be transferred on the respective network path within the time interval is assessed, and the assessed amounts of data are summed to obtain an aggregate amount of data that can be transferred from the sender node to the receiver node within the time interval.

According to another implementation of the disclosure, a method is provided for transferring data. The method comprises receiving an initiation time for initiating a desired data transfer and a network path for executing the desired data transfer, the initiation time and the network path determined from a network map of a network, a sender identifier associated with a sender node in the network, a receiver identifier associated with a receiver node in the network, and a predicted availability of the sender node, the receiver node, or both the sender node and the receiver node. The method further comprises initiating, at the initiation time, the desired data transfer from the sender node to an intermediate node in the network path, and storing, at the intermediate node, the data for a predetermined amount of time before transmitting the data from the intermediate node towards the receiver node along the network path.

According to another implementation of the disclosure, a system is provided for recommending a network path for a data transfer. The system comprises a database, a user interface, and a processor. The database is configured to store a network map of a network. The user interface configured to receive input data regarding a desired data transfer, the input data including a sender identifier associated with a sender node in the network, a receiver identifier associated with a receiver node in the network, a size of the desired data transfer, and a performance metric. The processor is configured to identify, using the network map, a plurality of candidate network paths between the sender node and the receiver node, each of the candidate network paths including at least one intermediate node for receiving data originating from the sender node and transmitting the data towards the receiver node, assess, according to the performance metric, a score associated with each of the candidate network paths in the plurality of candidate network paths, and select one of the candidate network paths when the one of the candidate network paths is associated with a score that exceeds a threshold.

In some implementations, a first candidate network path is associated with a first score representative of a first amount of transfer time and a second candidate network path is associated with a second score representative of a second amount of transfer time. The first score is higher than the second score when the first amount of transfer time is shorter than the second amount of transfer time. In some implementations, the performance metric corresponds to an amount of active transfer time, an amount of end-to-end transfer time, or a combination of both an amount of active transfer time and an amount of end-to-end transfer time. In an example, the performance metric corresponds to an amount of maximum data that can be transferred from a specified sender to a specified receiver in a time period, such as an hour, 24 hours, 3 days, or any other suitable time period.

According to another implementation of the disclosure, a system is provided for assessing an amount of transferable data between two nodes. The system comprises a database, a user interface, and a processor. The database is configured to store a network map of a network. The user interface is configured to receive input data regarding a desired data transfer, the input data including a sender identifier associated with a sender node in the network, a receiver identifier associated with a receiver node in the network, and a time interval. The processor is configured to identify, using the network map, a plurality of network paths between the sender node and the receiver node, each of the network paths including at least one intermediate node for receiving data originating from the sender node and transmitting the data towards the receiver node, assess, for a respective network path in the plurality of network paths, an amount of data that can be transferred on the respective network path within the time interval, and sum the assessed amounts of data to obtain an aggregate amount of data that can be transferred from the sender node to the receiver node within the time interval.

According to another implementation of the disclosure, a system is provided for transferring data. The system comprises a controller configured to receive an initiation time for initiating a desired data transfer and a network path for executing the desired data transfer, the initiation time and the network path determined from a network map of a network, a sender identifier associated with a sender node in the network, a receiver identifier associated with a receiver node in the network, and a predicted availability of the sender node, the receiver node, or both the sender node and the receiver node. The controller is further configured to initiate, at the initiation time, the desired data transfer from the sender node to an intermediate node in the network path, and store, at the intermediate node, the data for a predetermined amount of time before transmitting the data from the intermediate node towards the receiver node along the network path.

BRIEF DESCRIPTION

The above and other advantages of the disclosure will be apparent upon consideration of the following detailed description, taken in conjunction with the accompanying drawings, in which like reference characters refer to like parts throughout, and in which:

FIG. 13 is a table including network utilization percentage and bandwidth availability for the various hours of a typical day, according to an illustrative implementation of the disclosure;

Figure 19:
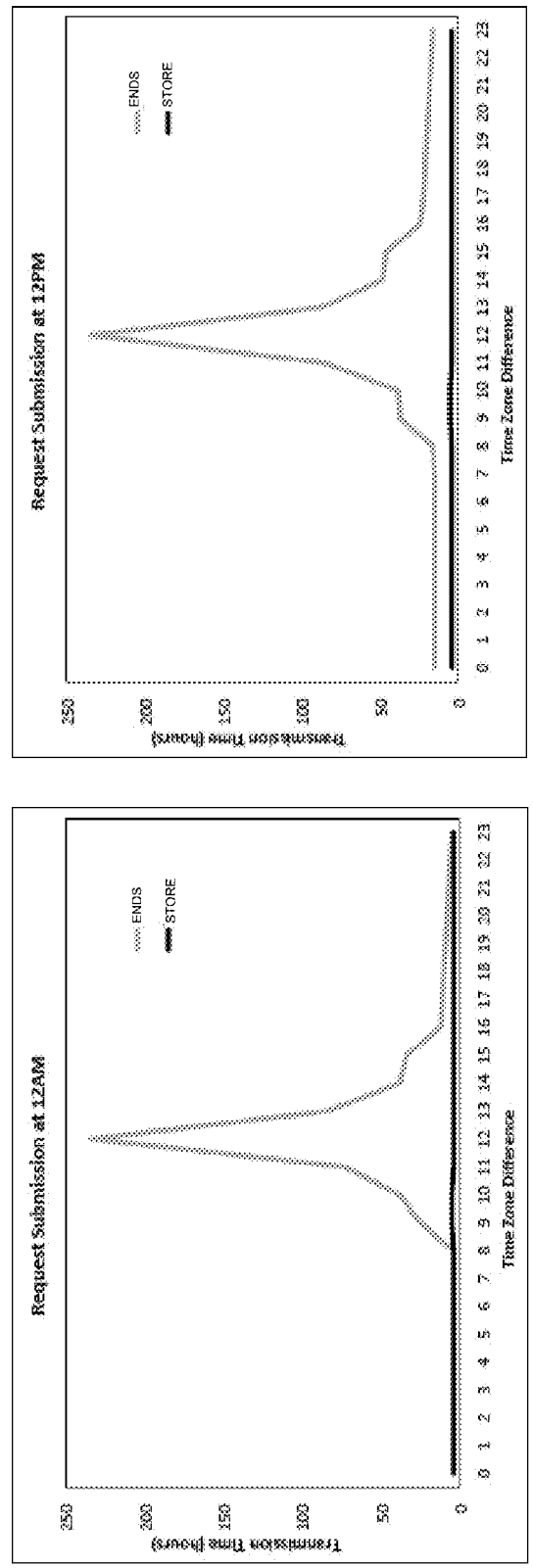
Figure 20:
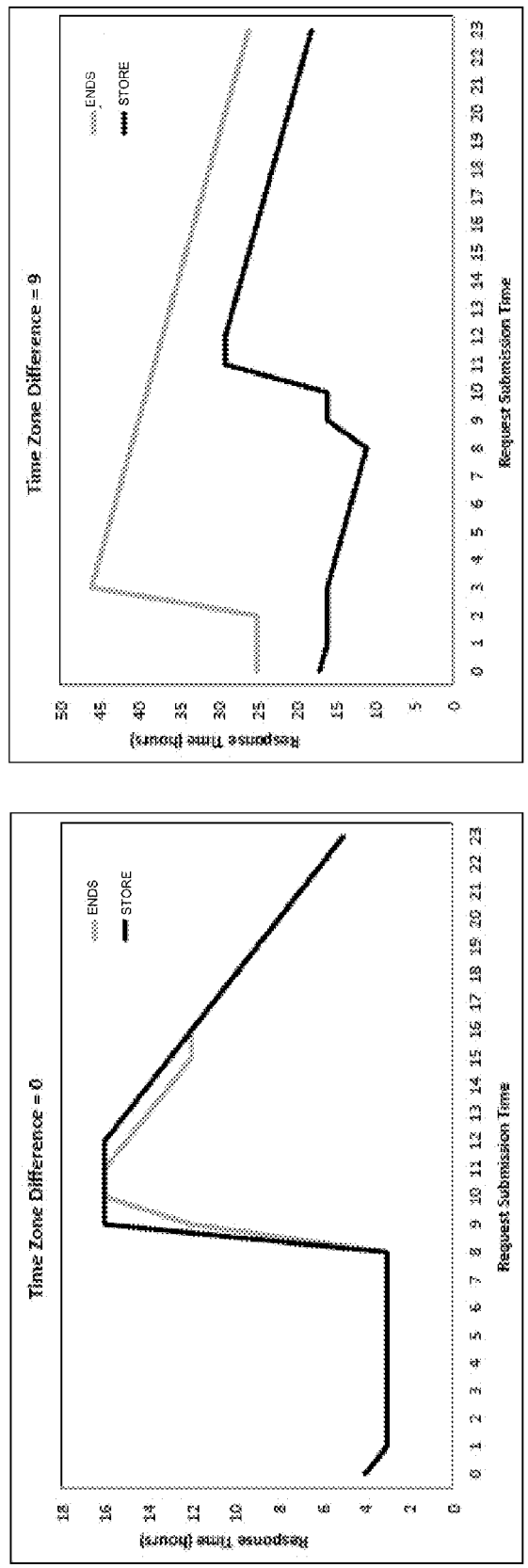
Figure 21:
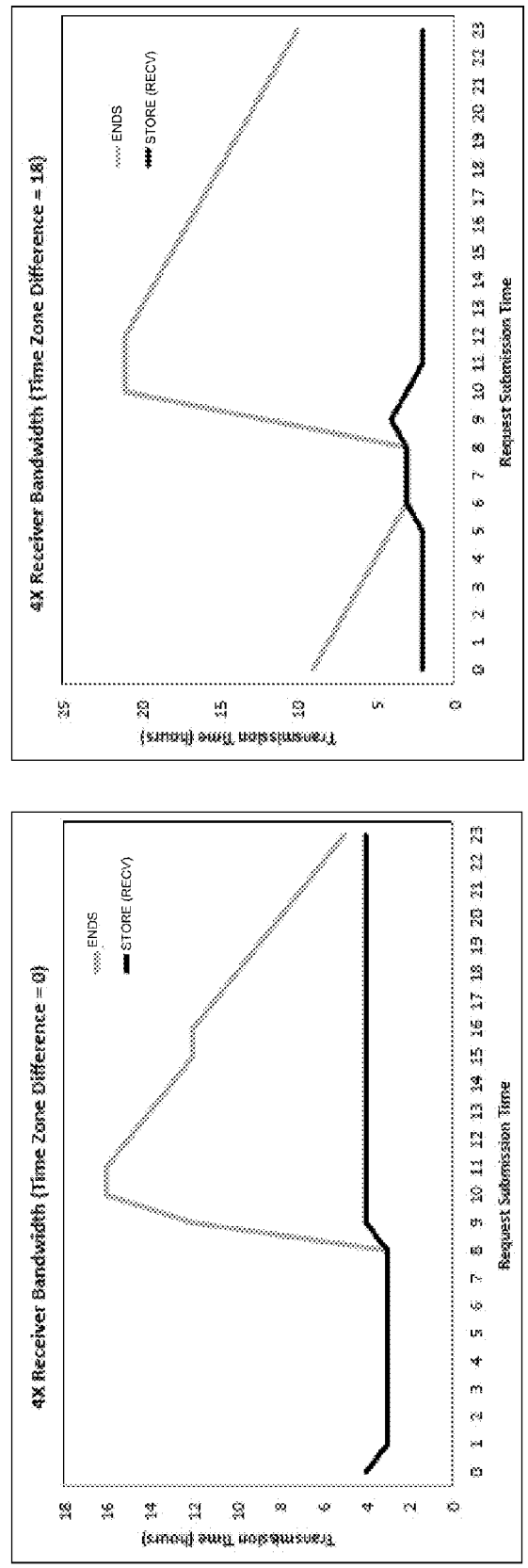
Figure 22:
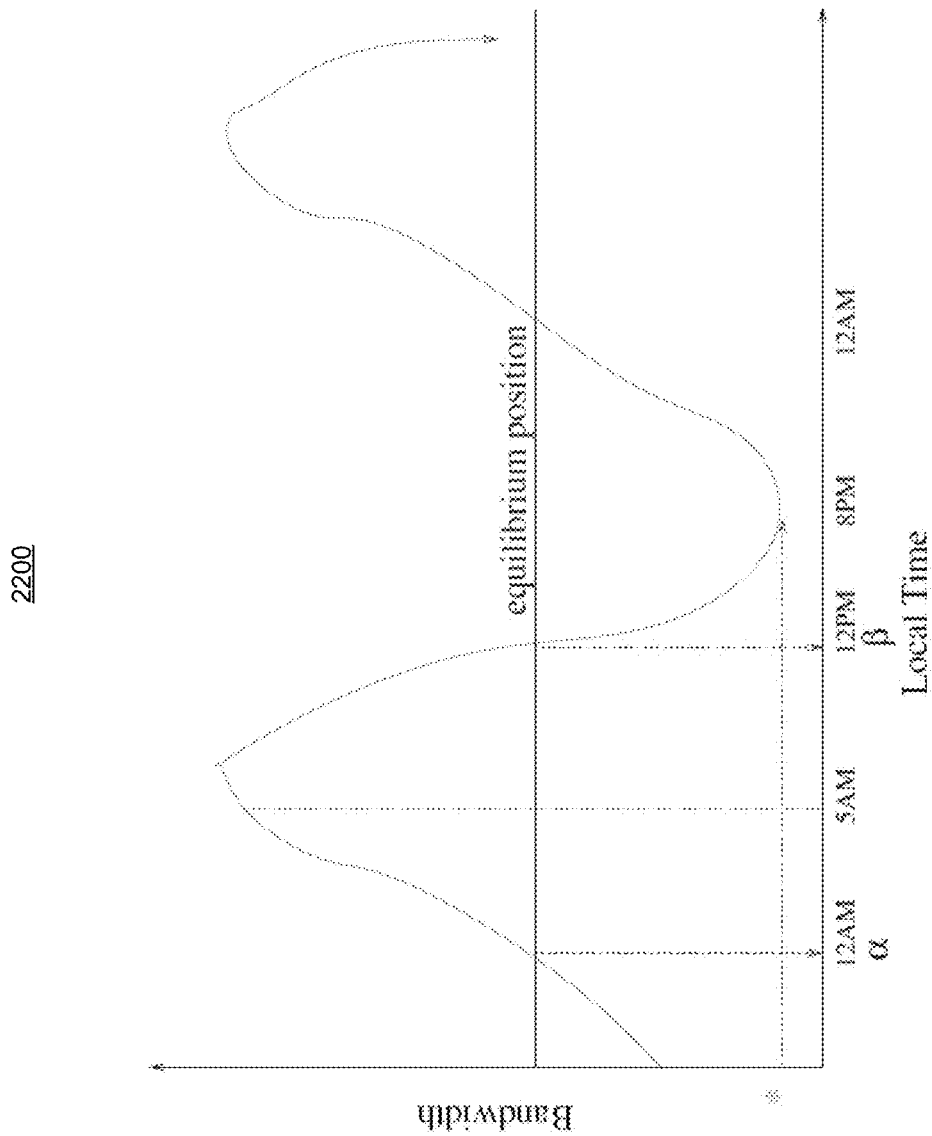
Figure 23:
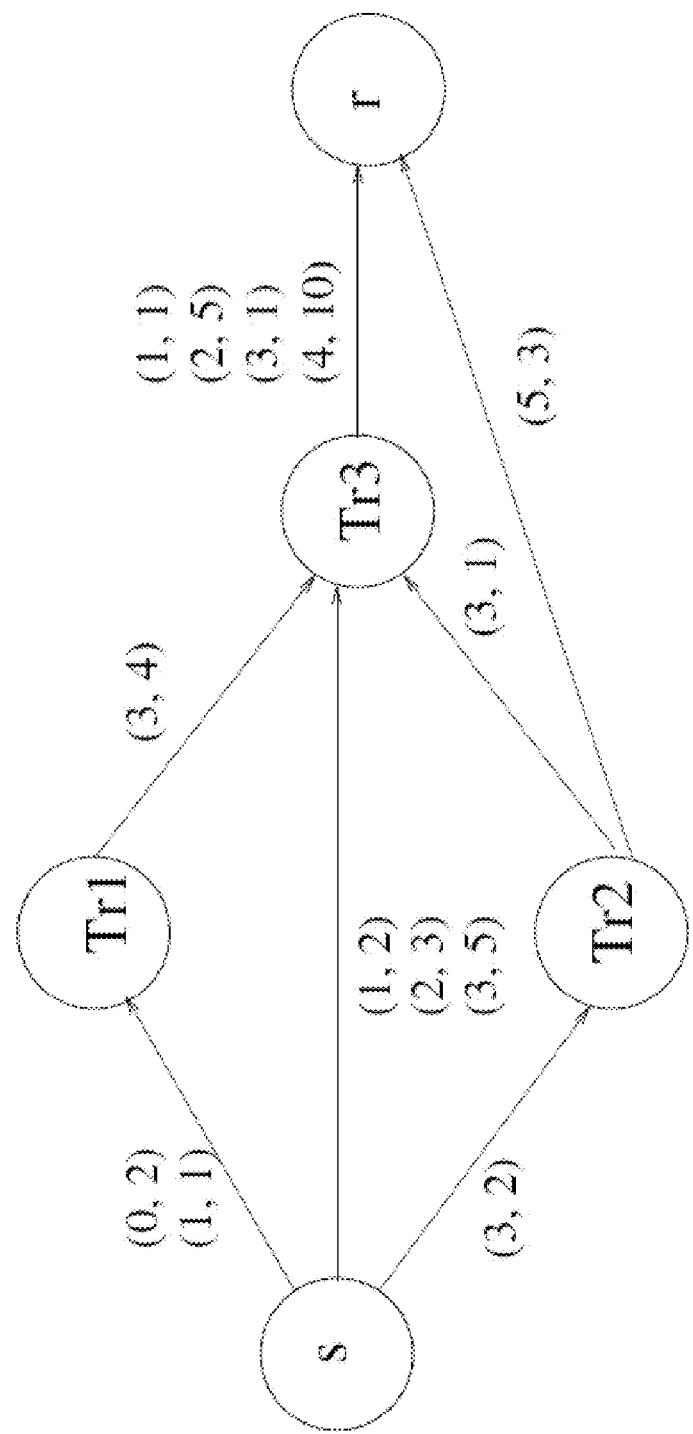
Figure 24:
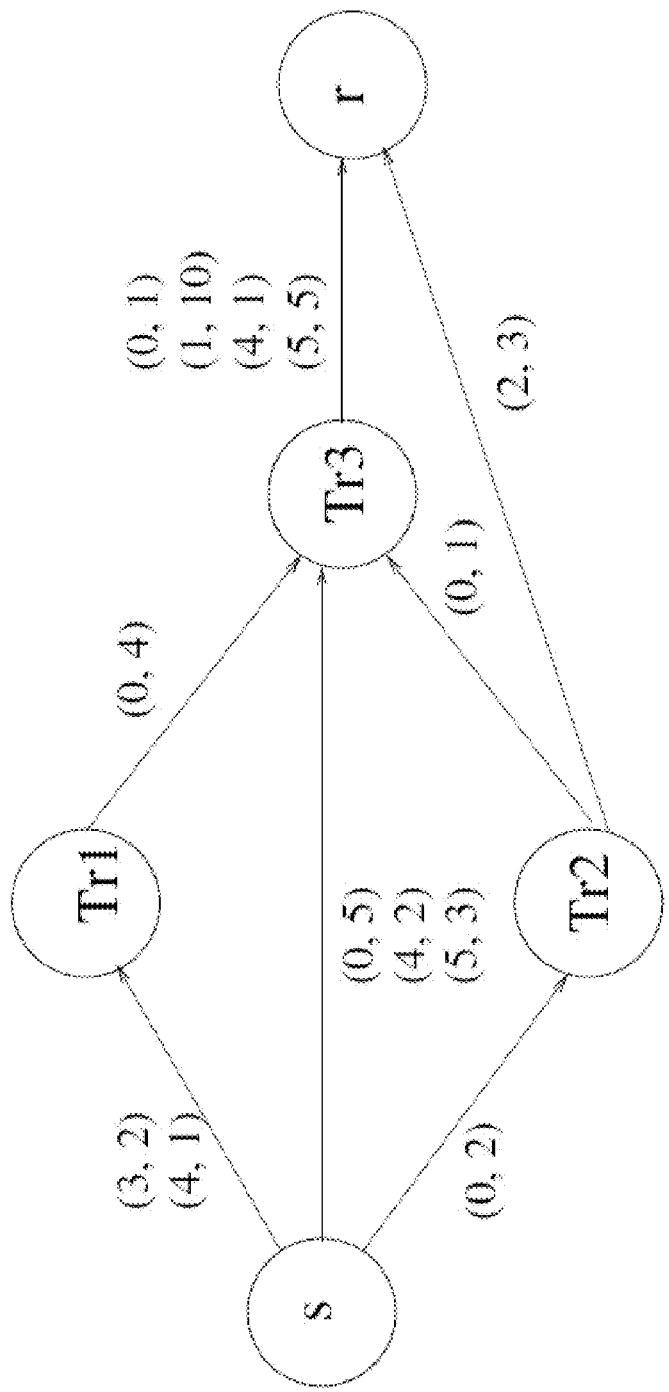
Figure 25:
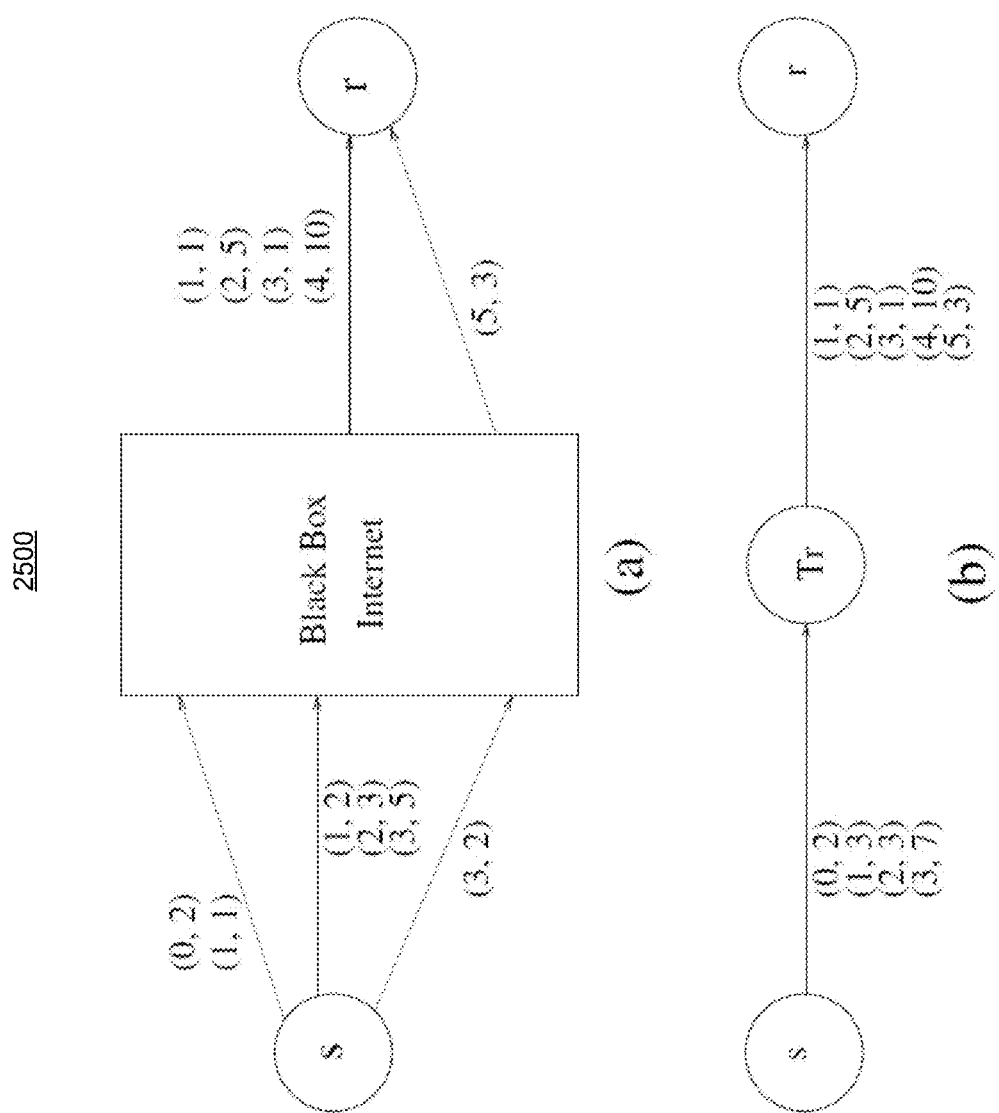
Figure 26:
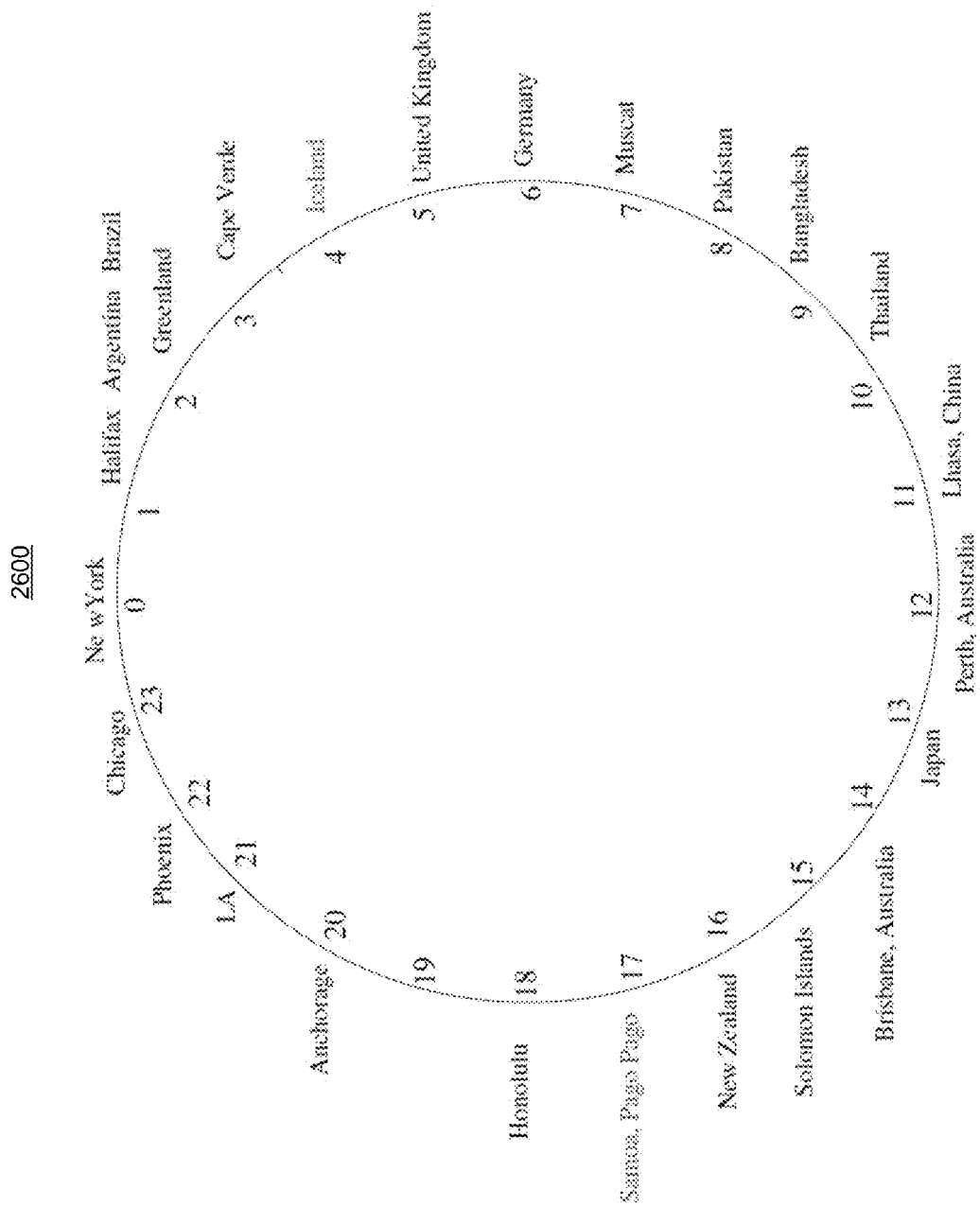

FIG. 18A-F show diagrams of transmission time as a function of initiate time for different time differences between the sender and the receiver, according to an illustrative implementation of the disclosure;

FIG. 19 shows diagrams of transmission times for the end-to-end model and the store-and-forward model as a function of time difference between the sender and the receiver for different data transmission initiation time, according to an illustrative implementation of the disclosure;

FIG. 20 shows diagrams of response times for the end-to-end model and the store-and-forward model as a function of transmission initiation time for different time differences, according to an illustrative implementation of the disclosure;

FIG. 21 shows diagrams of the transmission time at the receiver's network when the receiver has four times as much bandwidth as the sender, according to an illustrative implementation of the disclosure;

FIG. 22 is a diagram of edge capacity for a typical two day period on a private network, according to an illustrative implementation of the disclosure;

FIG. 23 is a diagram of a network flow graph depicting a time-varying network, according to an illustrative implementation of the disclosure;

FIG. 24 is a diagram of a time-shifted network flow graph depicting a time-varying network, according to an illustrative implementation of the disclosure;

FIG. 25 is a diagram of a bounded network that corresponds to a bounded version of a time-varying network, according to an illustrative implementation of the disclosure; and FIG. 26 is a diagram of a network map that includes the relative time differences between various locations, according to an illustrative implementation of the disclosure.

DETAILED DESCRIPTION

To provide an overall understanding of the systems and methods described herein, certain illustrative embodiments will now be described, including a system for identifying bandwidth for electronic data transmission. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

The present disclosure provides systems and methods for identifying one or more data transfer parameter for electronic data transmission. In particular, a technique for identifying bandwidth in a network is described herein that considers various characteristics of the network. Examples of network characteristics include the architecture of the network, the end users of the network, and the distance between the sender and the receiver (such as the time zone difference, for example). A performance model that evaluates bulk data transfers and provides predictions for transfer performance is described herein. The entire data transfer from the sender to the receiver is modeled, including intermediate networks that are operated by internet service providers.

The performance model computes one or more performance metrics using a set of inputs such as network connections, network pathway information, varying bandwidth availability for each link in the network, file sizes, and storage node information. The model calculates one or more metrics using the set of inputs as constraints. One example of a metric provided by the model is the maximum amount of data that can be transferred across any number of links defined in the model in a specific amount of time. In another example, the model provides the optimal time to initiate the transfer in order to utilize maximum bandwidth availability. In another example, the model provides the optimal pathway between the sender and the receiver for delivering the data in the shortest amount of time. The performance metric may correspond to an amount of transfer time, such as an amount of active transfer time (the amount of time that data is actively being transferred between any two nodes before the transfer is complete) or an amount of end-to-end transfer time (the amount of time between the initiation of the data transfer at the sender and the completion of the data transfer at the receiver). In general, and as is described in more detail below, the performance metric may correspond to any other definition of a transfer time for a data transfer.

In particular, an amount of traffic in a network, (i.e., an amount of network congestion) is often dependent on the sleep-wake cycle of the network's end users. There is more traffic (and less network availability) when the end users are awake and less traffic (and more network availability) when the end users are asleep. Thus, when a sender and a receiver have unsynchronized sleep cycles, bandwidth may be more available at the sender during a time when bandwidth is less available at the receiver, or vice versa. The present disclosure uses the sleep cycles of the end users to identify available bandwidth for data transmission.

Figure 6:
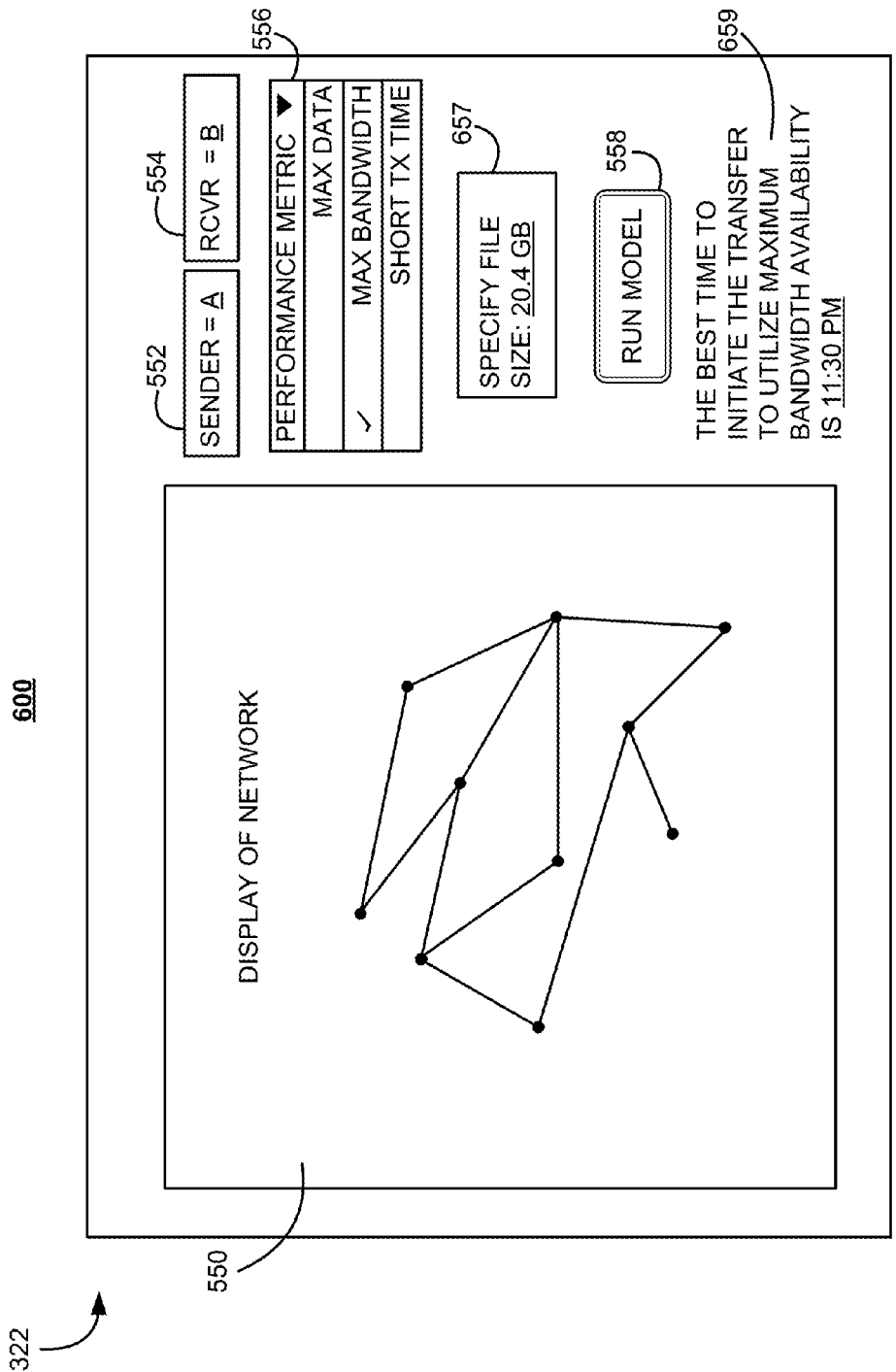
FIG. 6 is a diagram of an exemplary display of a user interface for running a modeling engine when a desired performance metric is related to maximizing bandwidth availability for a specified size of a data transfer, according to an illustrative implementation of the disclosure.
Figure 7:
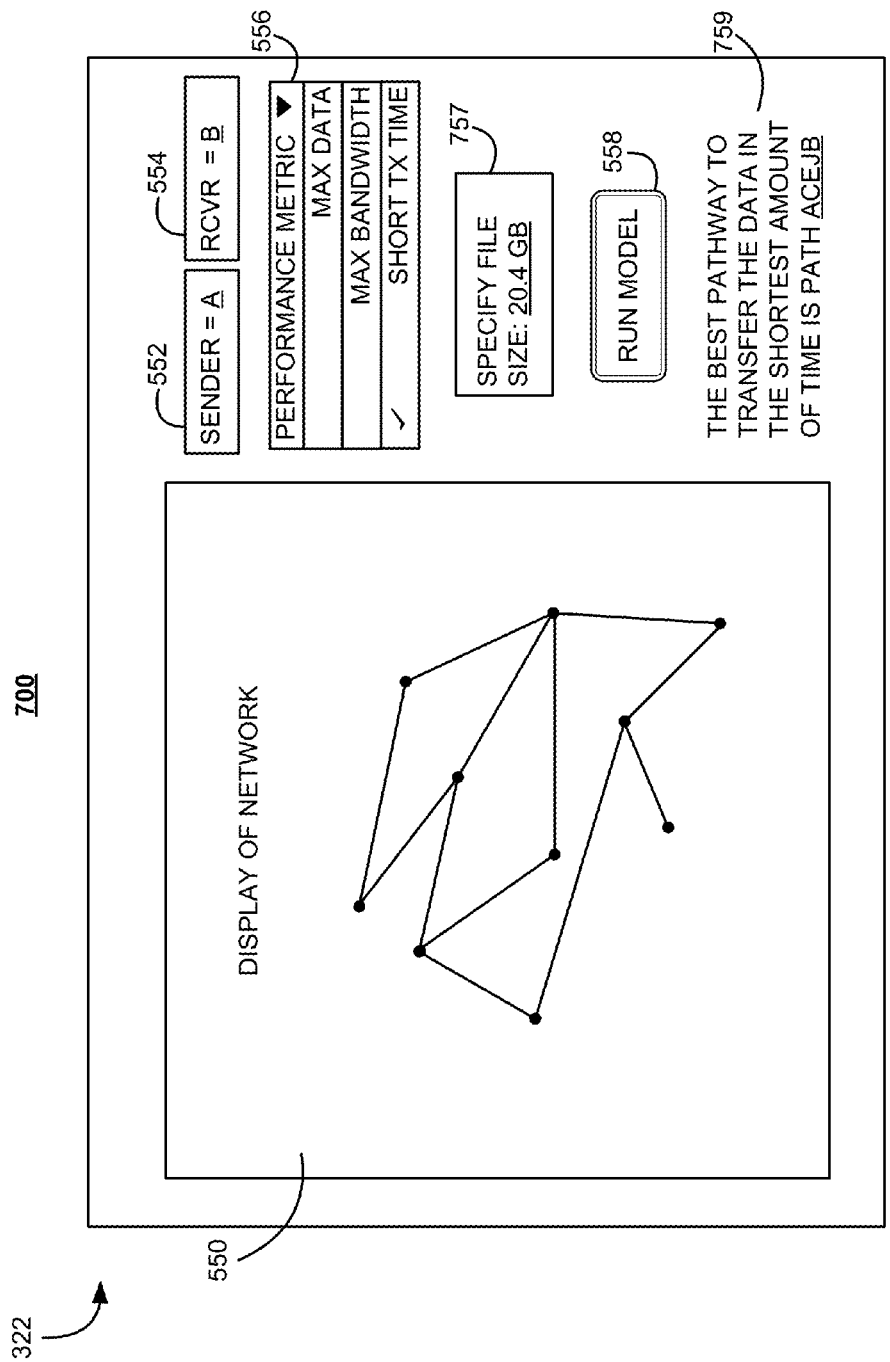
FIG. 7 is a diagram of an exemplary display of a user interface for running a modeling engine when a desired performance metric is related to completing a data transfer in a minimal amount of time, according to an illustrative implementation of the disclosure.
Figure 10:
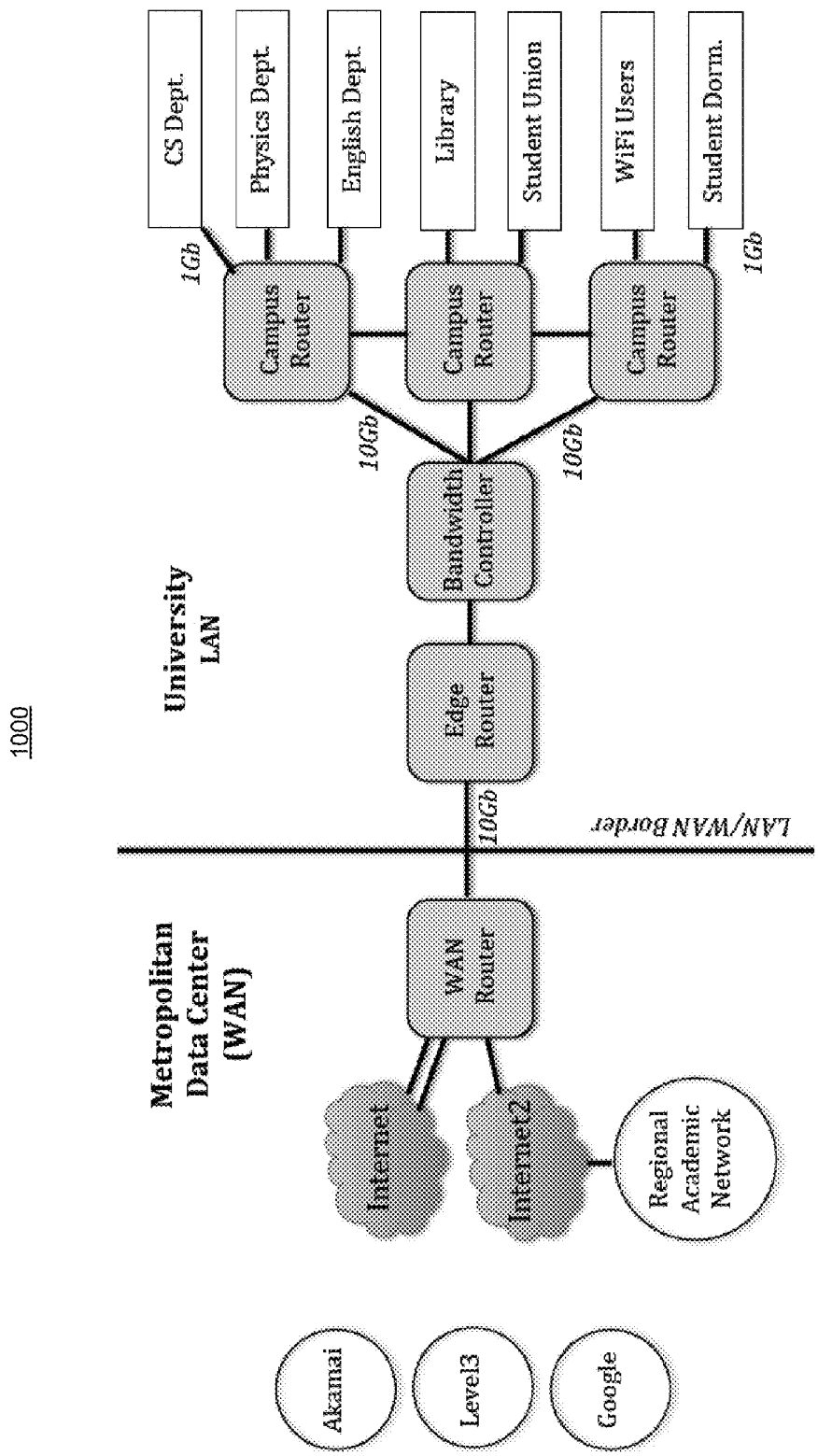
FIG. 10 is a diagram of a network layout between a private network and a shared data center in a nearby metropolitan area, according to an illustrative implementation of the disclosure.
Figure 11:
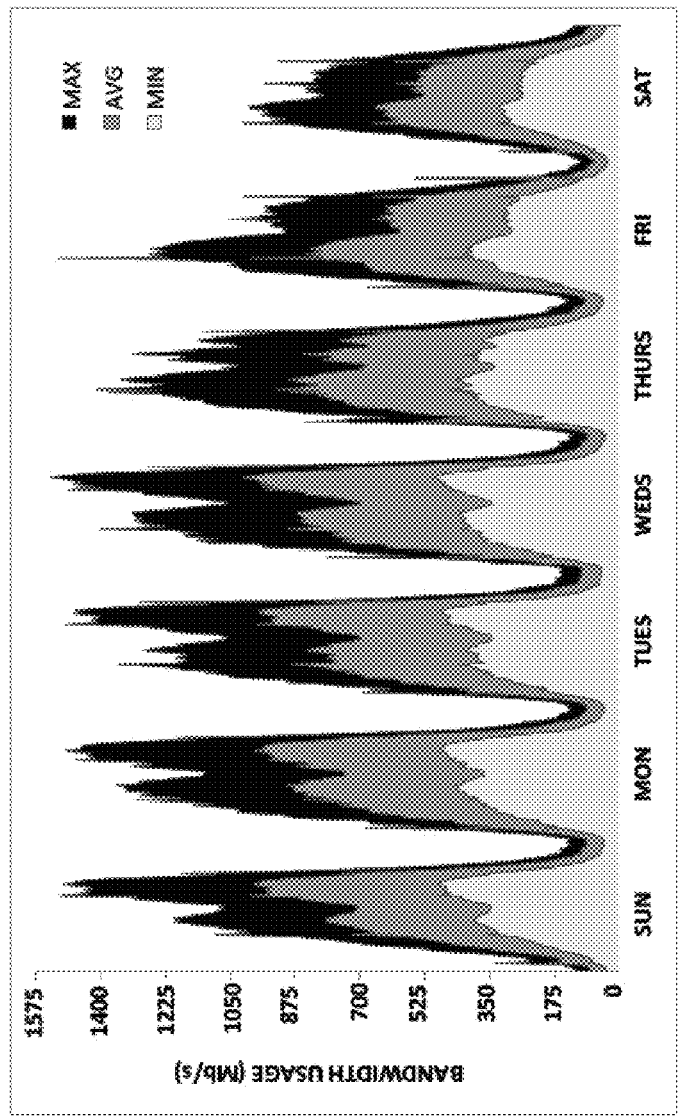
FIG. 11 is a diagram of bandwidth usage for a typical week on a private network, according to an illustrative implementation of the disclosure.
Figure 12:
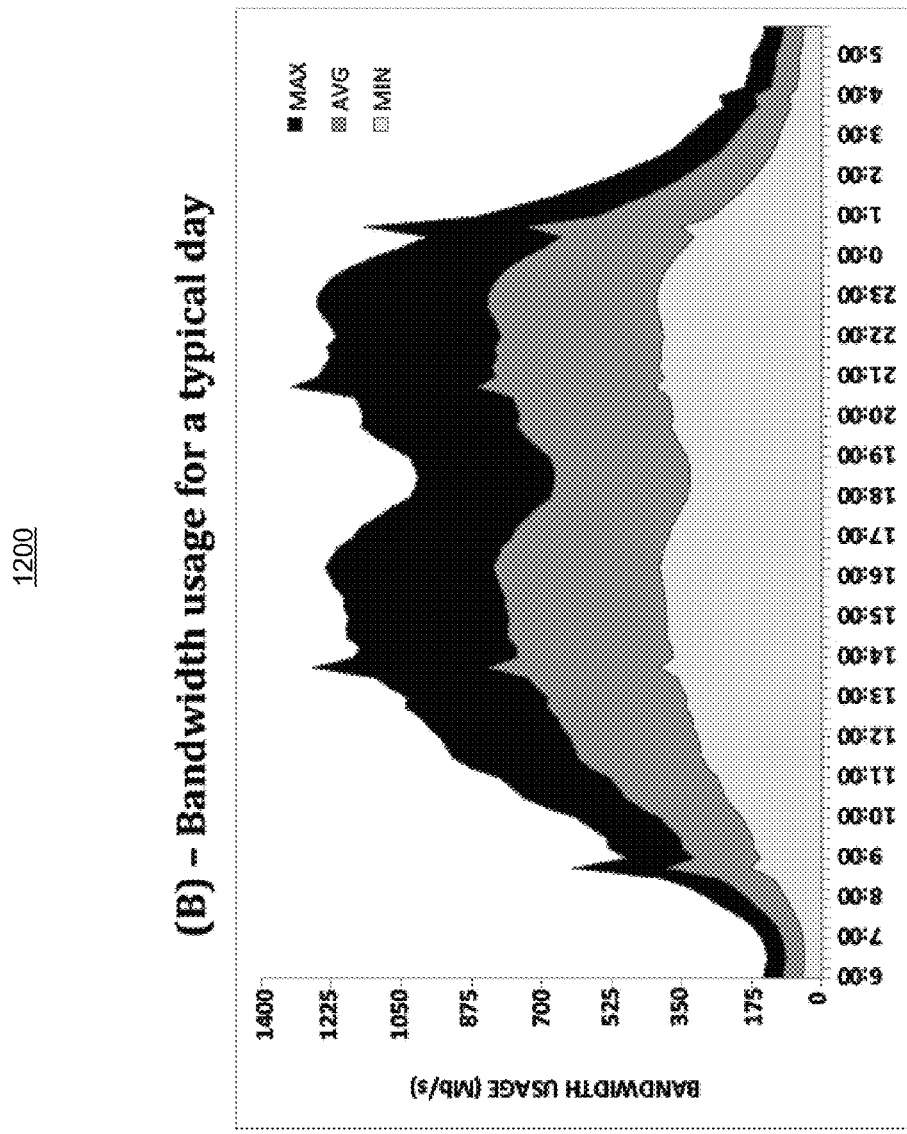
FIG. 12 is a diagram of bandwidth usage for a typical day on a private network, according to an illustrative implementation of the disclosure.
Figure 14:
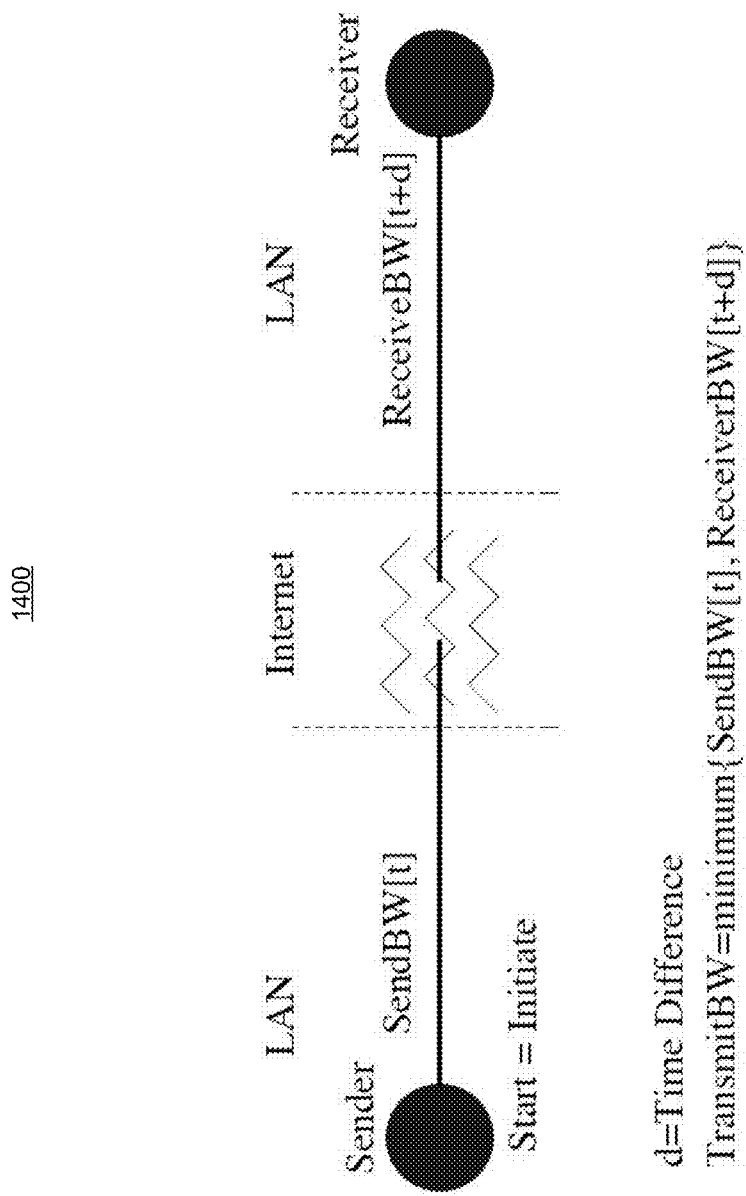
FIG. 14 is a diagram of a end-to-end model for file transmissions over a network, according to an illustrative implementation of the disclosure.
Figure 15:
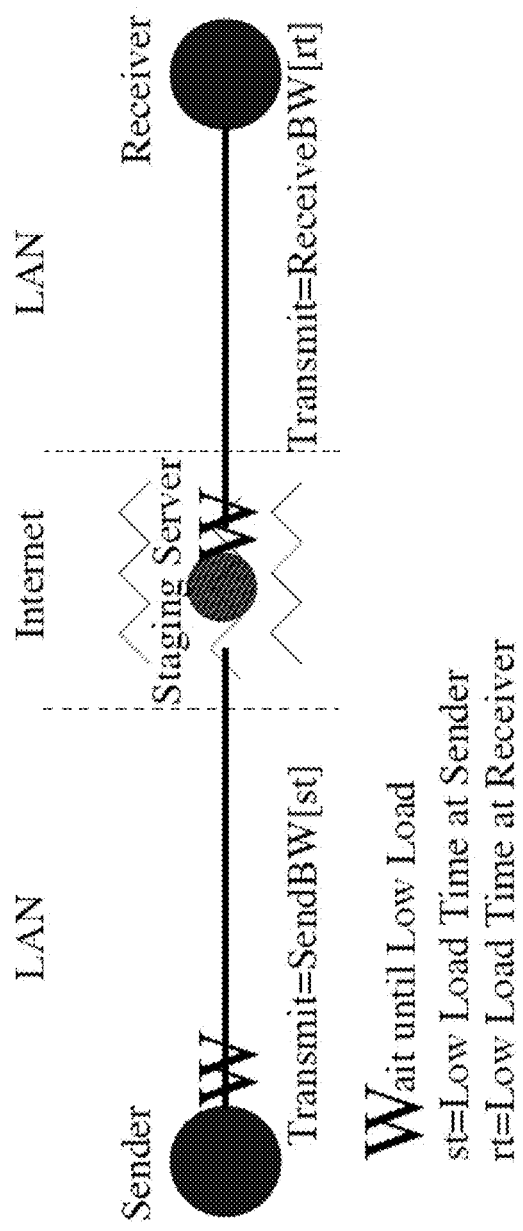
FIG. 15 is a diagram of a store-and-forward model for file transmissions over a network, according to an illustrative implementation of the disclosure.
Figure 16:
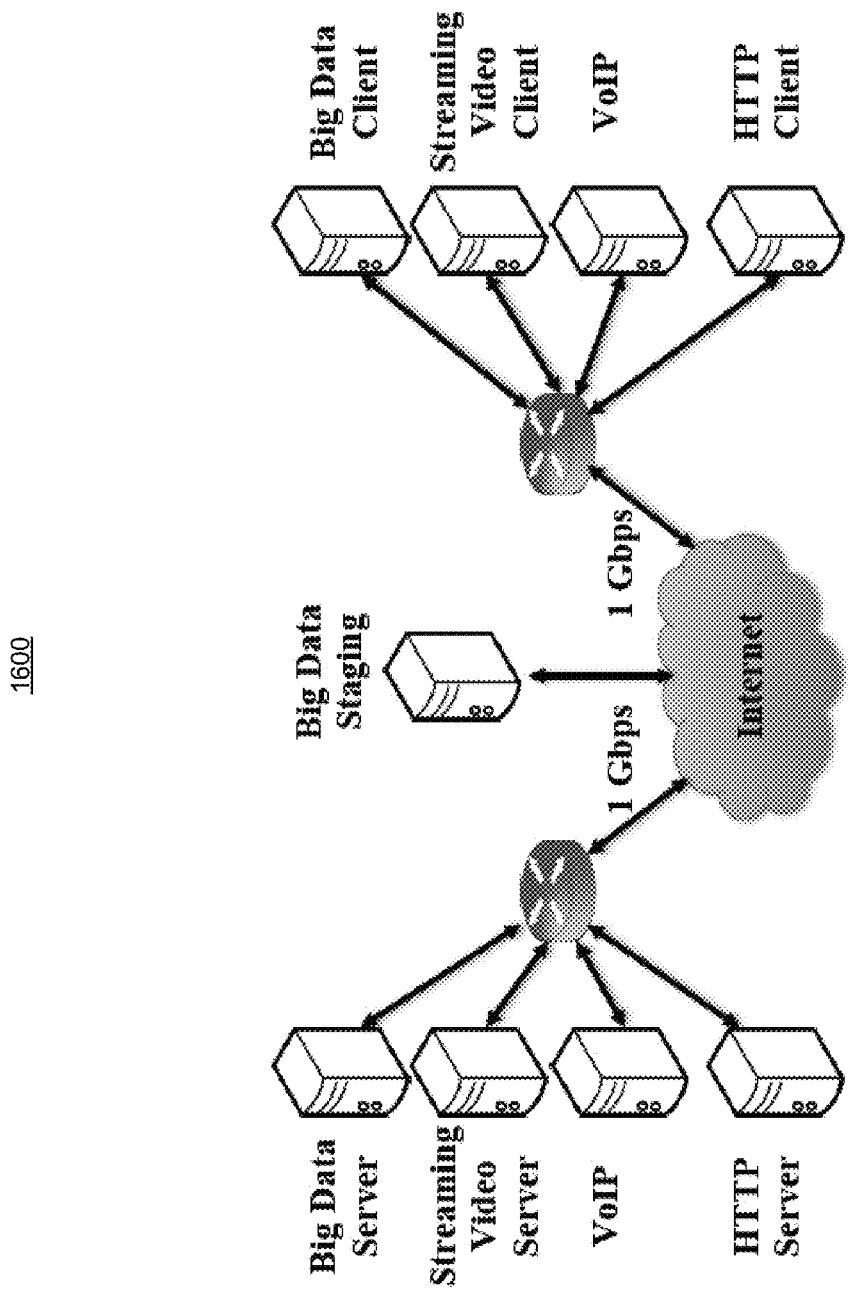
FIG. 16 is a diagram of a simulator configuration map, according to an illustrative implementation of the disclosure.

The systems and methods of the present disclosure may be described in more detail with reference to FIGS. 1-25. More particularly, an exemplary modeling engine and its components are described with reference to FIGS. 1-4. Specific implementations of user displays are depicted in FIGS. 5-7. The system may provide information about performing the modeling as described with reference flow charts in FIGS. 8-9. FIG. 10 shows a diagram of a university network connected to a larger network, and FIGS. 11-13 depict bandwidth utilization on a university network as a function of time. FIGS. 14 and 15 show diagrams of a end-to-end model and a store-and-forward model, respectively, for network transmission of big data, and FIGS. 17-21 show results graphs of transmission times and response times for the end-to-end model and the store-and-forward model. FIG. 16 shows a diagram of a sender network connected to a receiver network over the internet. FIG. 22 shows a plot of available bandwidth on a network as a function of time, and FIGS. 23-25 show various network flow graphs for visualizing the data transfer process between a sender and a receiver.

Figure 1:
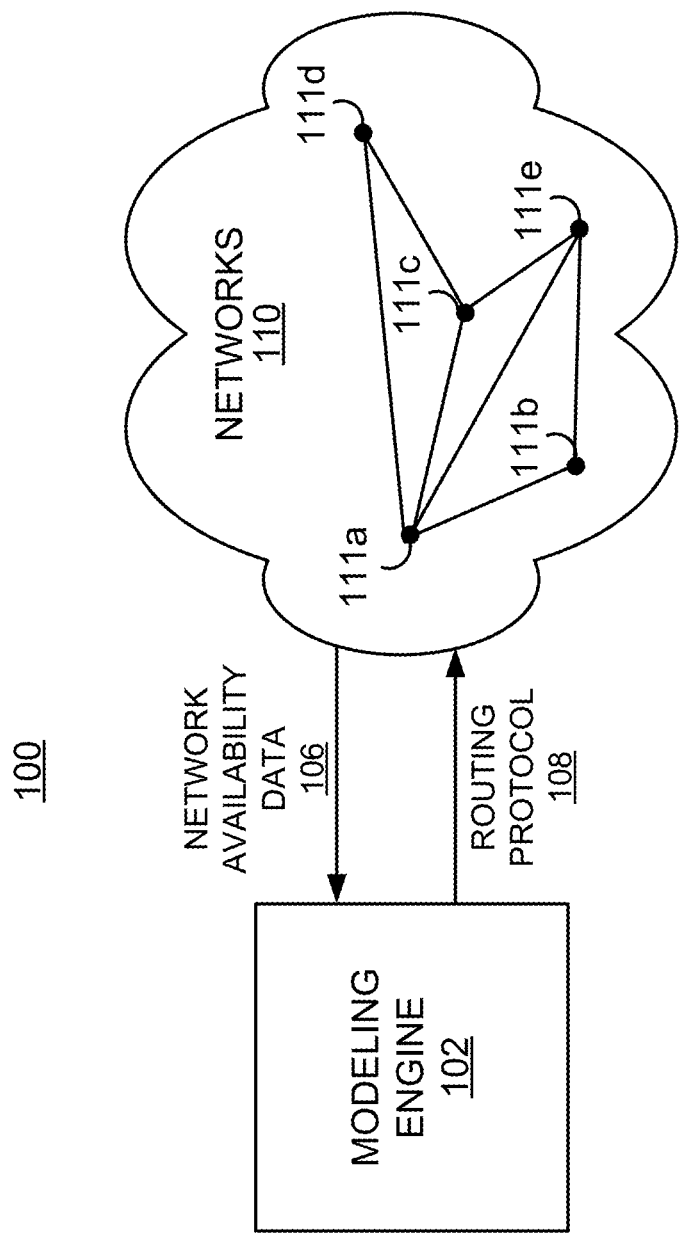
FIG. 1 is a block diagram of a system for providing one or more data transfer parameters, according to an illustrative implementation of the disclosure.

FIG. 1 is an illustrative block diagram of a system 100 for suggesting one or more parameters for data transfers over a network. System 100 includes a modeling engine 102 and multiple networks 110 with nodes 111a-111e (generally, node 111). Networks 110 make up an infrastructure that interconnect various nodes 111 and provides possible paths for transmitting data between two nodes 111. Networks 110 provide data such as network availability data 106 to modeling engine 102, which processes the network availability data 106 and returns a suggested routing protocol 108. Routing protocol 108 includes information regarding a data transfer, such as a time to initiate the data transfer, an amount of time the data transfer will take, a recommended pathway in networks 110 for the data transfer, a maximum amount of data that may be transferred within a specified time window, a combination thereof, or any other suitable information regarding a data transfer.

Networks 110 may be a computer network interconnecting multiple nodes 111, which may include network devices such as routers, switches, computers, servers, or any other suitable network device. Furthermore, a node 111 may represent a subnetwork of networks 110. In particular, networks 110 may include a local area network, a backbone network, or any other suitable network that interconnects various network devices or pieces of network. Networks 110 may interconnect any number of subnetworks or network devices in limited or extended geographical locations. Networks 110 may include a computer network, a sensor network, or any other suitable system that includes nodes for performing certain functions. In networks 110, packets of data flow in the form of traffic along network paths, which sometimes include multiple intermediate nodes. In particular, a data packet originates at a sender node and often gets forwarded to multiple intermediate nodes before finally reaching its destination at a receiver node.

A node 111 determines a data packet's next immediate destination (i.e., intermediate nodes or final node) based at least in part on information marked on the data packet and a routing protocol 108. When this address is identified, node 111 forwards the packet over a network link to the packet's next immediate destination. Network links may be direct connections between two nodes 111 and may be formed over fiber optic cable connections, over wireless connections, or any other transmission mechanism capable of transferring data from one node to another node. In addition, two nodes may be connected to each other over multiple distinct links, which may be used for failsafe operation or to reduce the transfer time.

A node 111 may include a router, a switch, a computer, a server, or any other suitable network device whose functions include receiving incoming packets and forwarding the packets to another node. In some implementations, the routing is performed at the application level. In some implementations, the routing protocol 108 received from modeling engine 102 provide instructions for how the nodes should forward the data packets. For example, a routing protocol 108 may include the use of one or more routing tables. A routing table may be stored directly in a node, or a node may access a routing table from a separate device. The routing table may include information related to the network topology immediately surrounding the node and may be used by a node to identify a next destination for a particular data packet. Some information associated with the data packet may be used in conjunction with the routing table to identify the next destination. Examples of such information associated with a data packet includes the size of a data packet, the user data, the control data, the destination address, quality of service information, or any other suitable information associated with a data packet that may affect a next destination of the data packet. In particular, this information may be available in a packet header or trailer.

Networks 110 transmit network availability data 106 of nodes 111 to modeling engine 102. In certain implementations, network availability data 106 indicates the availability of any number of nodes in networks 110. Availability may correspond to a health status of a node 111 or a capacity of a node 111. In particular, different nodes 111 may have different capacities at different times, such that it may be desirable to have more data sent through nodes with larger capacities compared to nodes with smaller capacities. In this case, providing node capacity information to modeling engine 102 may give rise to a routing protocol 108 that makes efficient use of relative capacities of various nodes in network 110. In another example, the network availability data 106 may be indicative of a temporary disabling of one or more node 111, such as for maintenance by a network administrator. In another example, the network availability data 106 may be indicative of packet drop statistics in one or more nodes, i.e., a number of data packets dropped in a time interval such as the last 1, 5, 10 minutes, or any other suitable time interval.

In some embodiments, network availability data 106 includes capacity information regarding links in networks 110. In particular, if a node 111 is in error or is otherwise incapable of receiving and/or forwarding data packets, the links between the node and its direct neighbors should not be used. In another example, a link may be down even if both of the nodes 111 at the link's endpoints are operational. In particular, a link may be temporarily disabled, and a corresponding link state may be indicative that the link is not operational. In another example, a link state may be indicative of a capacity of a corresponding link. In another example, multiple links may connect two nodes for fail safe operation, and a link state may be indicative of a number of multiple links. In some embodiments, network availability data 106 is provided by network administrators or internet service providers and may include historical data, trends, current availability, or projected availability.

In some embodiments, after providing an initial set of network availability data 106, network 110 provides updates to modeling engine 102 only when changes to the network availability data 106 occur. For example, when at least one node state changes, networks 110 provides the updated node state to modeling engine 102. Otherwise, no updates are provided. This option may be desirable if it is expected that network availability would not change often, and if providing network availability data 106 to modeling engine 102 is expensive.

When network availability data 106 is updated, modeling engine 102 may determine that a current data transfer process is no longer using an optimal routing protocol. In this case, modeling engine 102 may evaluate a cost associated with pausing the current data transfer and restarting the data transfer according to an updated routing protocol. If the cost of pausing and restarting the data transfer is less than the cost of continuing the data transfer with the less than optimal routing protocol, modeling engine 102 may select to pause and restart the transfer. Otherwise, modeling engine 102 may allow the current data transfer to continue.

In addition to receiving network availability data 106, modeling engine 102 may also receive and store a network map of networks 110. Networks 110 may provide the network map directly to modeling engine 102, or another device may provide the network map. The network map may include information about networks 110 such as the locations of various nodes 111 and/or node identifiers identifying nodes 111. In some embodiments, the network map further includes the physical interconnections of nodes 111 (i.e., the network links that directly connect two nodes). The network map may be in any form, such as a data structure, a network table, a graphical image, or any other suitable way of representation network information. The network map may include specific information regarding the nodes or may simply include general information. In one example, a network map may include the specific identifiers for each node and stores a precise location of each node. In another example, a network map is a time zone map, which includes just the time zone of a number of nodes, and a routing protocol may be recommended based just on the respective time zones. A network represented by this type of network map may be referred to as a "time-zoned flow network." In particular, it may be desirable to transfer the data during the sleep portion of the sleep-wake cycle. In this case, the time zone information is relevant for determining a routing protocol that is suitable for recommendation. An example of a network map that is a time zone map including just the time zone of the nodes is shown in FIG. 26. In particular, the bandwidth availability across the globe is based on time zones. During the day, bandwidth availability of a location changes based on the time zone in which the node is located.

In an example, each node 111 is labeled with a node identifier such as an address, a data string, or any other suitable label that uniquely identifies the node. Updates regarding the network map may be provided to modeling engine 102 as necessary. For example, one or more nodes may be added to the network map if a new routing center becomes available. In another example, nodes may be removed or temporarily withheld from the network map if a routing center is down for maintenance or removed from the network for any reason. Networks 110 may transmit network availability data 106 to modeling engine 102 in the form of a data structure including a list of node identifiers (corresponding to the node identifiers in the network map, for example), link identifiers, and the associated node and link states. Any other suitable way of providing network availability data 106 and information about networks 110 to modeling engine 102 may also be used.

In some embodiments, networks 110 represent the internet, which may be modeled as a collection of independent networks. Each independent network may be referred to as an Autonomous System (AS). For a sender in one AS and a receiver in a different AS, routing between the sender and the receiver occurs at two levels: routing within each AS (intra-AS routing) and routing between two ASs (inter-AS routing). Intra-AS routing uses an Interior Gateway Protocol for determining paths within the AS and may be based on metrics such as hop count. However, because ASs are independent administrative entities, traffic exchange between two ASs is based on administrative policies and pricing policies, such that inter-AS routing may be driven by business policy constraints. Modeling the networks as the internet is described in more detail in relation to FIGS. 22-25.

Modeling engine 102 may treat standard internet transmissions (100 MB, for example) differently from bulk internet transmissions (100 GB, for example). This is because the optimal routing protocol for a standard internet transmission may be different from the optimal routing protocol for a bulk internet transmission. In particular, standard internet transmissions may be routed according to minimizing a combination of the hop count and business cost, while routes with maximum capacity or throughput are optimal for bulk transmissions. An important performance metric for bulk transmission is therefore the throughput: the higher the throughput, the shorter the amount of transmission time. Thus, one objective of modeling engine 102 is to determine the links between the sender and the receiver of a bulk transmission that have the highest capacity, or a capacity that exceeds some threshold.

Modeling engine 102 determines a routing protocol 108, which is a suggested set of parameters for a desired data transfer, based on the input data, including network availability data 106 and the network map. In addition, routing protocol 108 may further be determined based on other input data, such as identifiers for the sender node and the receiver node, a size of the desired data transfer, a maximal amount of tolerable time for the data transmission, and one or more performance metrics for the desired data transfer. The suggested set of parameters may include one or more specific pathways on which the data transfer should take place, a recommended time to initiate the data transfer, a recommended amount of time for an intermediate node (between the sender and the receiver) to hold the data, a number of parallel links to open between any two nodes, or any other suitable parameter related to data transmission. For example, routing protocol 108 may determine the recommended links or nodes based on their projected availability during the transfer. The recommended links or nodes may correspond to those with capacities that exceed some threshold. The projected availability may be determined based on data provided by an administrative entity such as an internet service provider, or may be predicted based on the sleeping cycle of the time zone in which the sender, receiver, or any intermediate node resides.

In particular, the recommended links or nodes may be determined based on a score. For example, a number of candidate network paths may be identified. Each candidate network path has the same end points (i.e., the sender node and the receiver node) but different intermediate nodes in between the end points. Each candidate network path may be evaluated by assessing a score according to a performance metric. For example, the performance metric may correspond to an amount of active transfer time (i.e., the amount of transfer time, not including any time that a node stores the data and is not transmitting the data) or an amount of end-to-end transfer time (i.e., the total amount of transfer time from when the data transfer is initiated at the sender to when the data transfer is completed at the receiver). The amount of transfer time that is calculated for each network path may be computed based on a predicted availability of one or more nodes, such as the sender node, the receiver node, or any intermediate node. The intermediate nodes correspond to nodes that reside on network paths between the sender node and the receiver node that receive data that originates from the sender node and may hold the data for a specified amount of time before transmitting the data towards the receiver (i.e., to another intermediate node or directly to the receiver node). The predicted availability of a node may be determined according to a time zone of the node's location or historical data that may be provided by internet service providers. The score may correspond to the amount of transfer time. Alternatively, the score may have an inverse relationship with the transfer time, such that a network path with a higher score corresponds to a lower transfer time, and vice versa. In this case, the candidate network paths may be evaluated to determine the optimal network path, or the network path that results in the best performance or least amount of transfer time. In another example, the candidate network paths may be evaluated until a network path is identified that has a score that exceeds some threshold. Modeling engine 102 and its components are described in more detail in relation to FIGS. 3 and 4.

Figure 2:
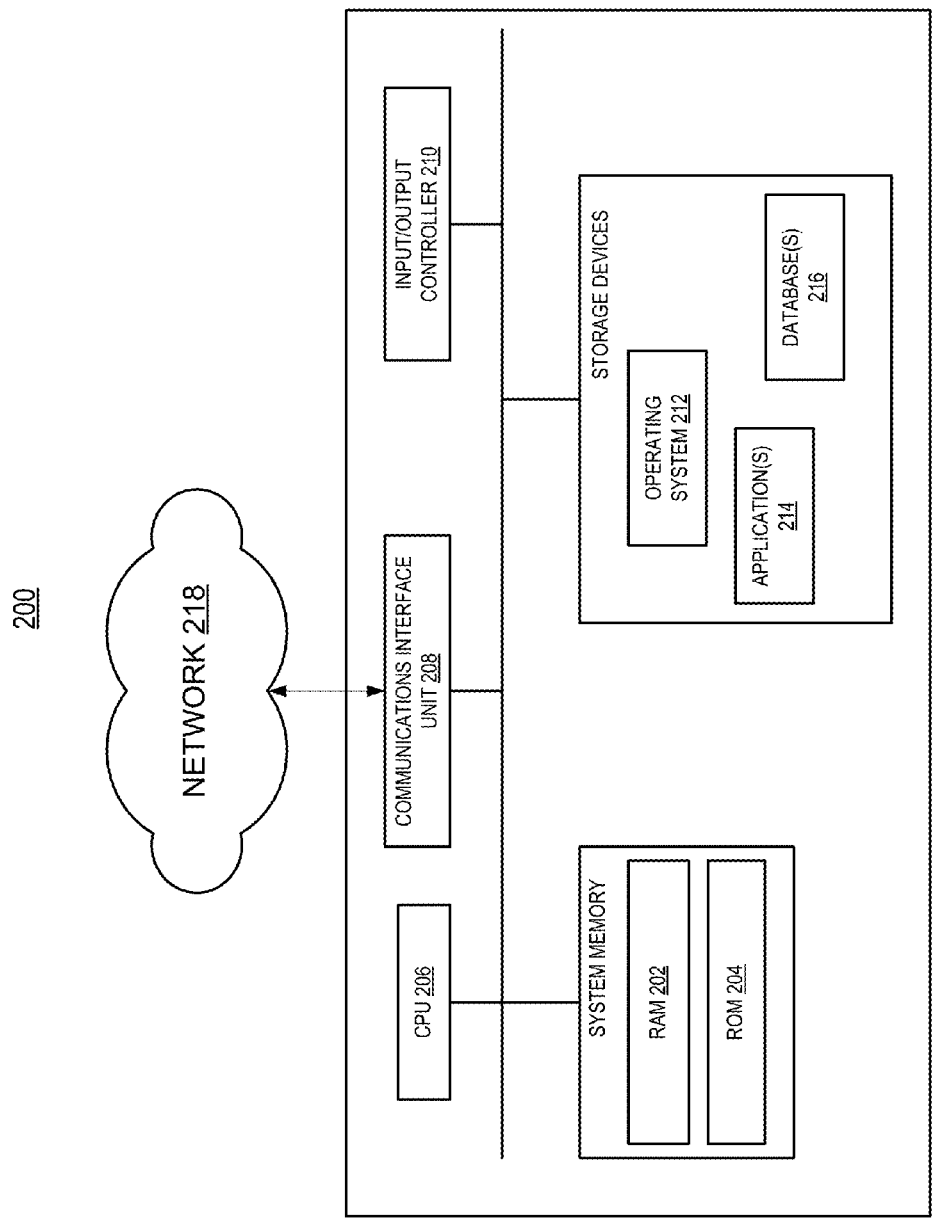
FIG. 2 is a block diagram of a computing device for performing any of the processes described herein, according to an illustrative implementation of the disclosure.

FIG. 2 is a block diagram of a computing device for performing any of the processes described herein. Each of the components described herein may be implemented on one or more computing devices 200. In certain aspects, a plurality of the components of these systems may be included within one computing device 200. In certain implementations, a component and a storage device may be implemented across several computing devices 200.

The computing device 200 comprises at least one communications interface unit, an input/output controller 210, system memory, and one or more data storage devices. The system memory includes at least one random access memory (RAM 202) and at least one read-only memory (ROM 204). All of these elements are in communication with a central processing unit (CPU 206) to facilitate the operation of the computing device 200. The computing device 200 may be configured in many different ways. For example, the computing device 200 may be a conventional standalone computer or alternatively, the functions of computing device 200 may be distributed across multiple computer systems and architectures. In FIG. 2, the computing device 200 is linked, via network or local network, to other servers or systems.

The computing device 200 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 208 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 206 comprises a processor, such as one or more conventional microprocessors and one or more supplementary co-processors such as math co-processors for offloading workload from the CPU 206. The CPU 206 is in communication with the communications interface unit 208 and the input/output controller 210, through which the CPU 206 communicates with other devices such as other servers, user terminals, or devices. The communications interface unit 208 and the input/output controller 210 may include multiple communication channels for simultaneous communication with, for example, other processors, servers or client terminals in the network 218.

The CPU 206 is also in communication with the data storage device. The data storage device may comprise an appropriate combination of magnetic, optical or semiconductor memory, and may include, for example, RAM 202, ROM 204, flash drive, an optical disc such as a compact disc or a hard disk or drive. The CPU 206 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 206 may be connected to the data storage device via the communications interface unit 208. The CPU 206 may be configured to perform one or more particular processing functions.

The data storage device may store, for example, (i) an operating system 212 for the computing device 200; (ii) one or more applications 214 (e.g., computer program code or a computer program product) adapted to direct the CPU 206 in accordance with the systems and methods described here, and particularly in accordance with the processes described in detail with regard to the CPU 206; or (iii) database(s) 216 adapted to store information that may be utilized to store information required by the program.

The operating system 212 and applications 214 may be stored, for example, in a compressed, an uncompiled and an encrypted format, and may include computer program code. The instructions of the program may be read into a main memory of the processor from a computer-readable medium other than the data storage device, such as from the ROM 204 or from the RAM 202. While execution of sequences of instructions in the program causes the CPU 206 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to identifying bandwidth for electronic data transmission as described herein. The program also may include program elements such as an operating system 212, a database management system and device drivers that allow the processor to interface with computer peripheral devices (e.g., a video display, a keyboard, a computer mouse, etc.) via the input/output controller 210.

The term "computer-readable medium" as used herein refers to any non-transitory medium that provides or participates in providing instructions to the processor of the computing device 200 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 206 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 200 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
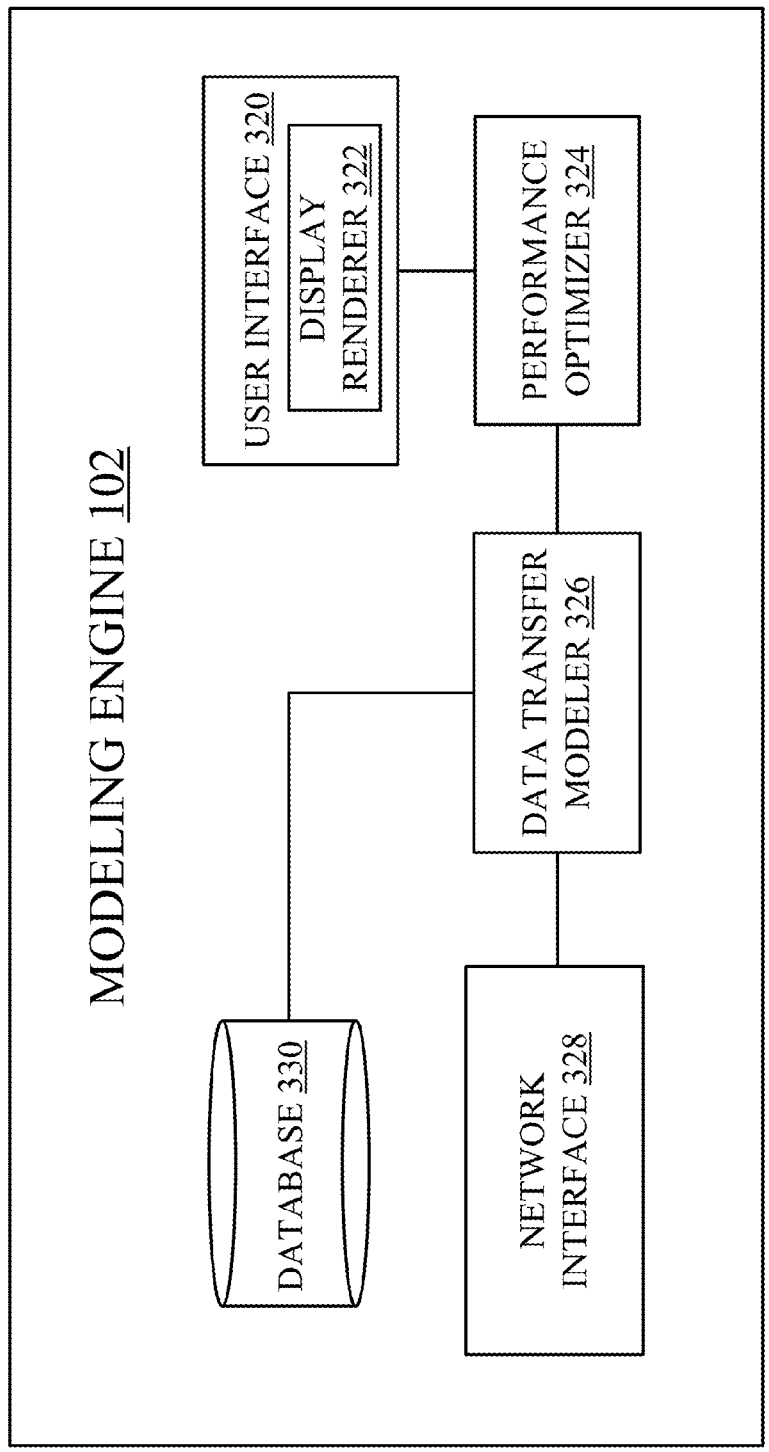
FIG. 3 is a block diagram of a modeling engine for determining a data transfer parameter, according to an illustrative implementation of the disclosure.

The computing device 200 may be used for any of the components in modeling engine 102. FIG. 3 is a block diagram of modeling engine 102 for identifying optimal routing protocols. Modeling engine 102 includes several components for interfacing with other devices and data storage and processing. In particular, modeling engine 102 includes user interface 320, database 330, network interface 328, data transfer modeler 326, and performance optimizer 324. Modeling engine 102 receives network availability data 106 from networks 110 and provides routing protocols 108.

Modeling engine 102 communicates with networks 110 over network interface 328 and with a user over user interface 320 and display renderer 322. In an example, modeling engine 102 generates routing protocols 108 based on a network map (which may be stored in database 330) and based on network availability data received from networks 110 (which may also be stored in database 330). In particular, data transfer modeler 326 may model the projected data transfer using a directed flow graph such as those shown in FIGS. 23-25. Furthermore, performance optimizer 324 may solve the network flow graph to find an optimal solution, or may apply heuristics as described in relation to FIG. 25 to simplify the problem to find a "good-enough" solution, according to performance metrics that may be specified by a user interacting with user interface 320. Data transfer modeler 326 and performance optimizer 324 are described in more detail in relation to FIG. 4.

Figure 4:
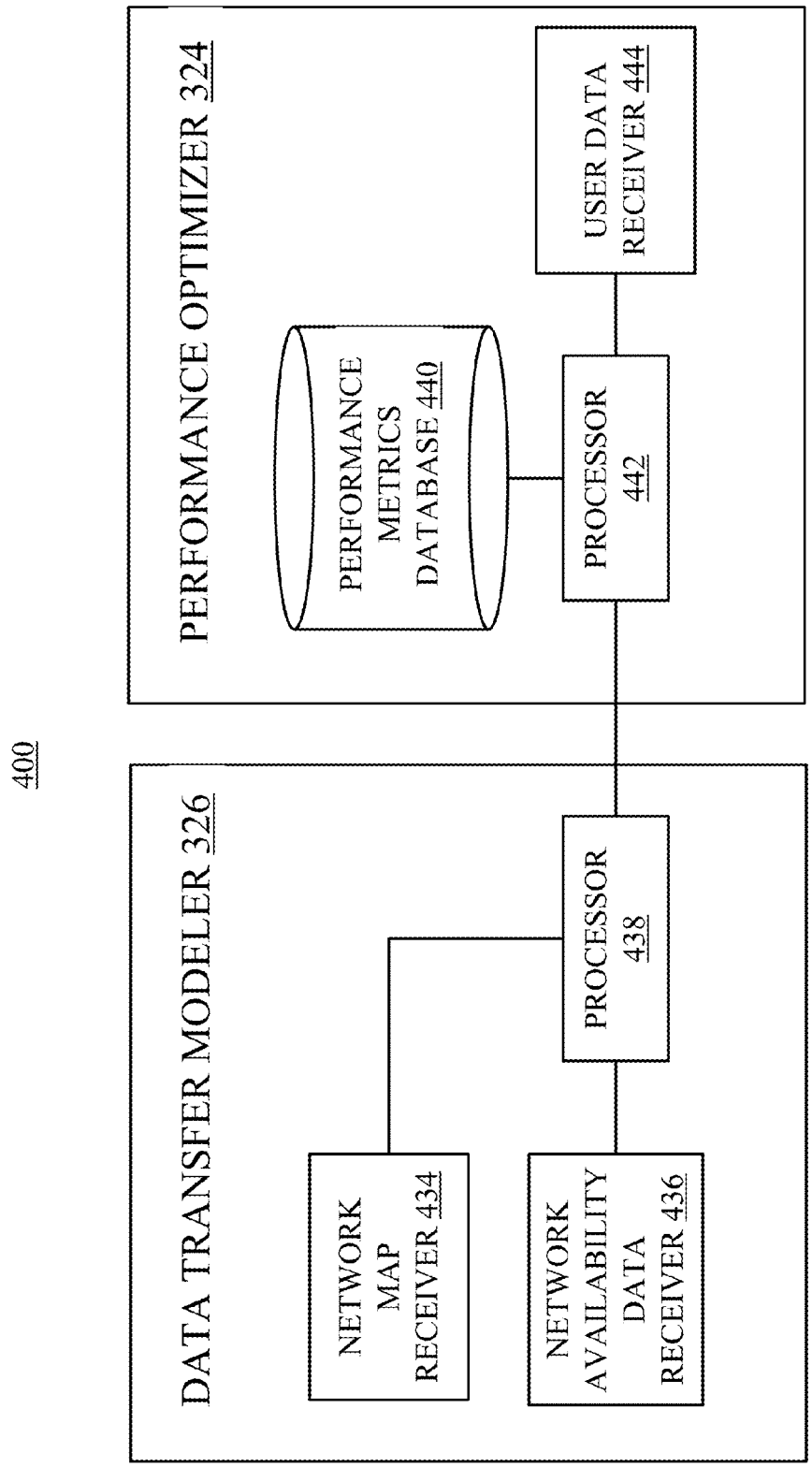
FIG. 4 is a block diagram of a data transfer modeler and a performance optimizer for determining a data transfer parameter for recommendation, according to an illustrative implementation of the disclosure.

FIG. 4 is a block diagram of data transfer modeler 326 and performance optimizer 324. Data transfer modeler 326 further includes a processor 438, and performance optimizer 324 further includes a processor 442. As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that is currently being processed. An illustrative computing device 200, which may be used to implement any of the processors and servers described herein, is described in detail with reference to FIG. 2. In particular, processor 438 receives the network map from network map receiver 434, receives the network availability data from network availability data receiver 436, and implements a series of calculations that predicts various parameters of a data transfer process. Performance optimizer 324 receives input data (from user interface 320, for example) over user data receiver 444. Processor 442 receives the user data, which includes a performance metric of interest, as described in relation to FIGS. 1 and 5-7. Based on the desired performance metric, the network map, and the network availability data, processors 438 and 442 may work together to determine one or more parameters of the data transfer process that are suitable for recommendation.

As shown in FIGS. 3 and 4, data transfer modeler 326 and performance optimizer 324 are separate components, but in general, data transfer modeler 326 and performance optimizer 324 may be part of the same component and may share the same processor, receiver, and/or databases.

FIGS. 5-7 show exemplary displays of a user interface for receiving user input such as a sender, a receiver, a size of a desired data transfer, a time interval over which the transfer should take place, or any other suitable parameter applicable to a desired data transfer. The displays of FIGS. 5-7 show three different performance metrics that may be used to determine one or more suggested data transfer parameters, but one of ordinary skill in the art will understand that other performance metrics may be used without departing from the scope herein.

Figure 5A:
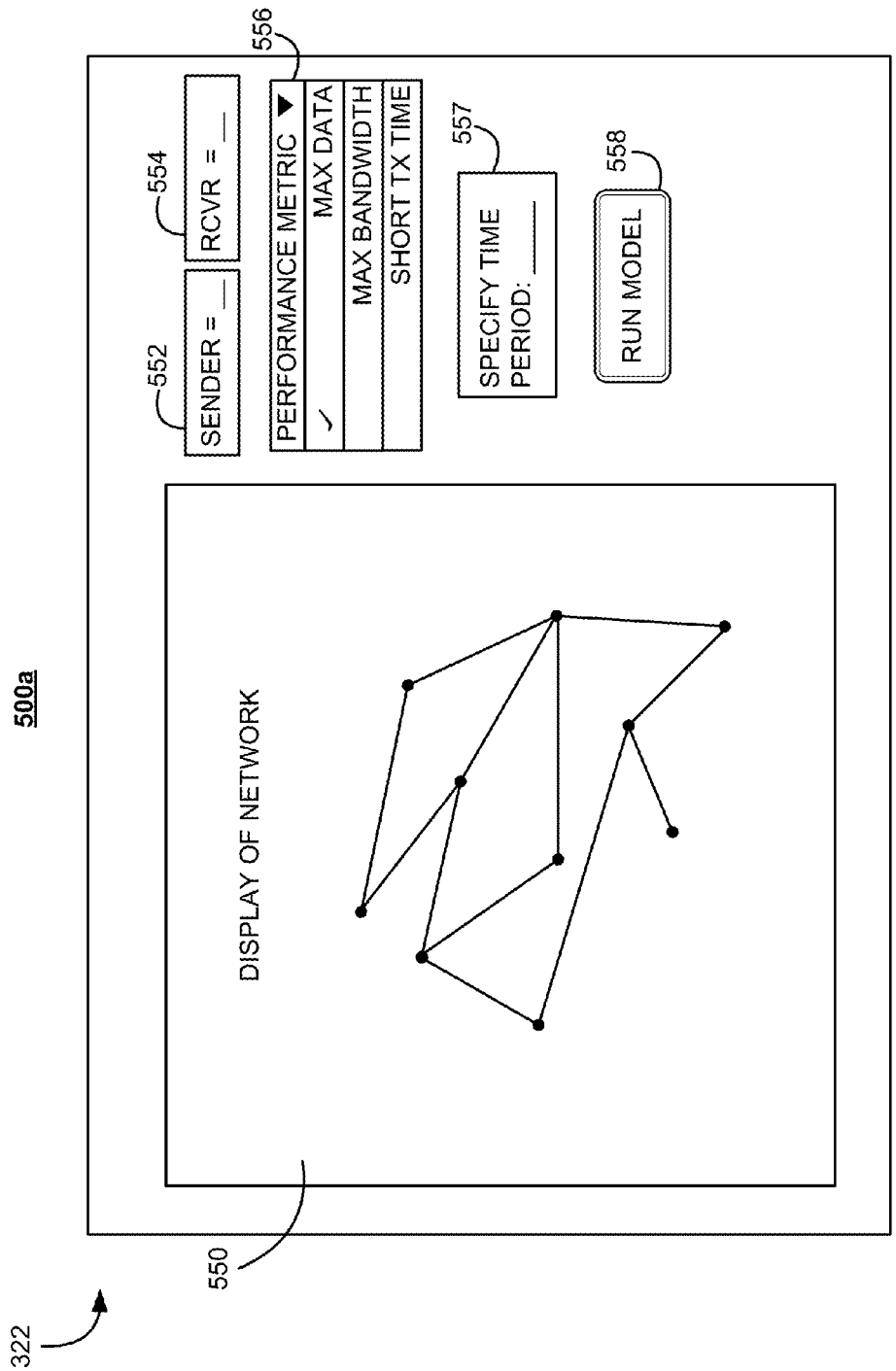
FIGS. 5A-5B are diagrams of exemplary displays of a user interface for running a modeling engine when a desired performance metric is related to transferring a maximal amount of data within a selected time interval, according to an illustrative implementation of the disclosure.
Figure 5B:
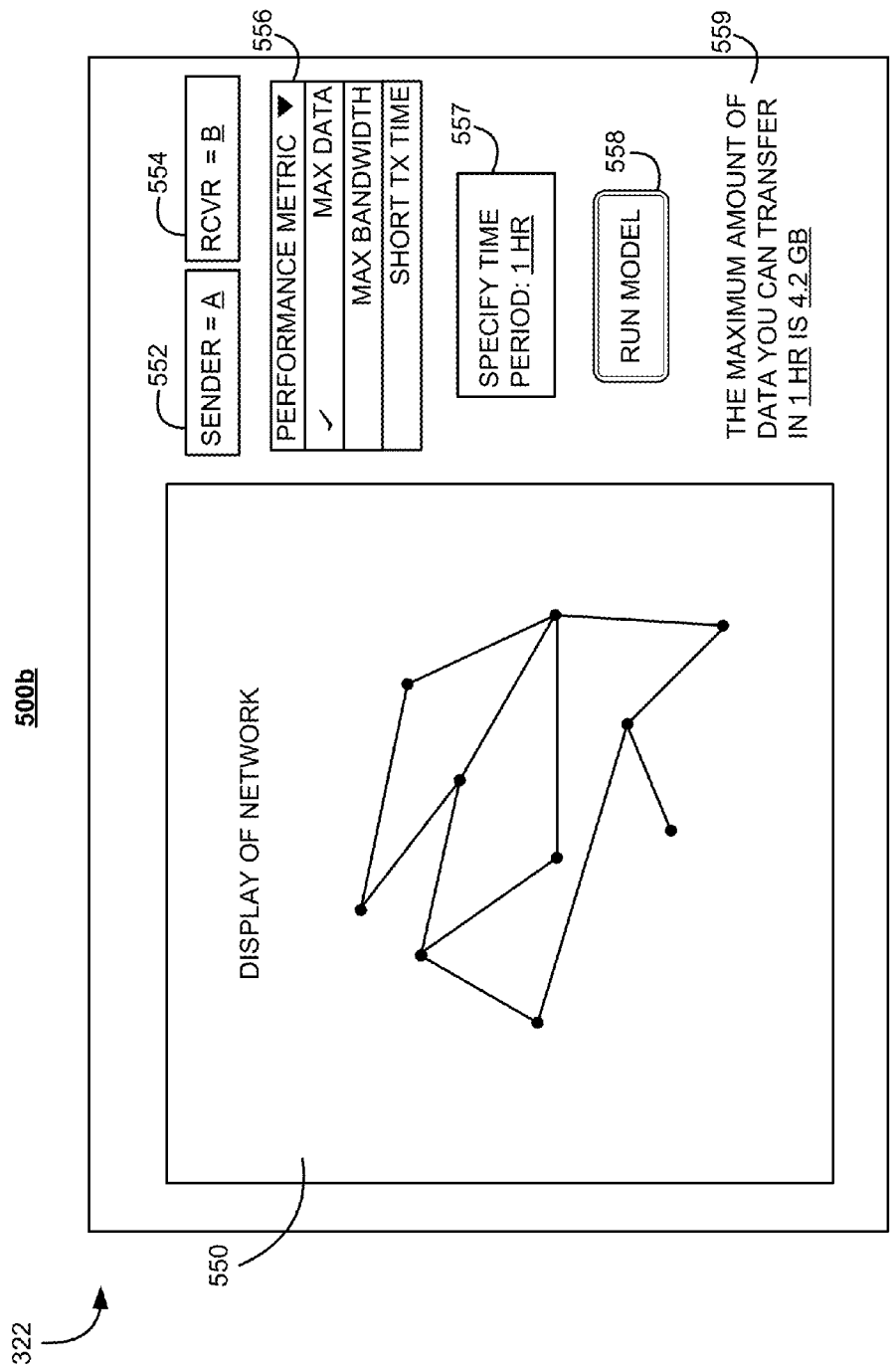

FIGS. 5A-5B are diagrams 500a-500b of exemplary displays of a user interface for a user interacting with modeling engine 102. In diagrams 500a-500b, the left hand side of the display includes a display 550 of the network, which may include a portion of networks 110 that modeling engine 102 is configured to model. In particular, display 550 includes a network map indicating relative locations of different nodes in the network, which may correspond to sender nodes, receiver nodes, and/or routing centers. In diagrams 500a-500b, a user has selected a "max data" option as the desired performance metric. In the "max data" mode, modeling engine 102 determines a maximum amount of data that may be transferred from a user-specified sender (specified at input box 552) to a user-specified receiver (specified at input box 554) in a user-specified amount of time (specified at input box 557). Diagram 500b shows an exemplary display after a user has provided the user inputs at input boxes 552, 554, and 557. The user may select button 558 to run the model to view the output of modeling engine 102. After the model is run, output 559 is displayed. When the selected performance metric is "max data," output 559 includes the maximum amount of data that may be transferred from the specified sender 552 to the specified receiver 554 within the specified time interval 557.

In an example, output 559 may be determined by identifying multiple network paths between the sender and the receiver. In particular, the identified network paths may include favorable nodes and links over which modeling engine 102 recommends performing the data transfer. In an example, the links may be assessed sequentially to determine a maximum amount of data that can be transferred within the time interval, and the assessed amounts may be summed over the links and over the network paths to determine the output 559. As shown in FIG. 5B, output 559 includes the maximum amount of data that can be transferred within the specified time interval. In some embodiments, output 559 further includes which nodes are part of the one or more identified network paths that contribute to the amount of data specified at output 559.

In some embodiments, a subset of network links is constructed from the network map. The subset of network links may include one or more ASs as described in relation to FIG. 1, and the one or more ASs are selected based on their respective time zones. The subset of network links represents a portion of networks 110 and may take less computational complexity or power to solve than the full set of networks 110. In particular, by reducing the number of nodes and links from the full set of networks 110 to a smaller portion, the present disclosure reduces the complexity of the computational techniques required to identify optimal or near optimal network paths or other parameters related to a data transfer.

FIG. 6 is a diagram 600 of an exemplary display of a user interface for a user interacting with modeling engine 102. As in diagrams 500a-500b, the left hand side of diagram 600 includes a display 550 of the network. In diagram 600, a user has selected a "max bandwidth" option as the desired performance metric. In the "max bandwidth" mode, modeling engine 102 determines a recommended time to initialize a data transfer from a user-specified sender (specified at input box 552) to a user-specified receiver (specified at input box 554) for a given file size (specified at input box 657). As in diagrams 500a-500b, the user selects button 558 to run the model to view the output of modeling engine 102. After the model is run, output 659 is displayed. When the selected performance metric is "max bandwidth," output 559 includes a recommended time to initiate the transfer of data that has the size 657 from a sender 552 to a receiver 554.

The recommended time may be selected from a set of candidate initiation times. For example, each of the candidate initiation times may be evaluated according to a performance metric (in this case, "max bandwidth"). That is, each of the candidate initiation times may be assessed a score corresponding to how much the hypothetical data transfer beginning at the respective candidate initiation time would utilize the bandwidth of the nodes. The recommended time that is output at output 559 may be determined after running through a set of candidate initiation times and selecting the time with the best score. In another example, the recommended time may correspond to the first candidate initiation time that is assessed to have a score that falls above (or below) a threshold. The score may be determined from the network availability profiles of the sender node, the receiver node, and any intermediate nodes on the network paths between the sender node and the receiver node. For example, the score may be assessed by identifying any bottleneck nodes that lie on a network path. Bottleneck nodes correspond to those nodes that may prolong the data transfer process.

FIG. 7 is a diagram 700 of an exemplary display of a user interface for a user interacting with modeling engine 102. As in diagrams 500a-500b, the left hand side of diagram 700 includes a display 550 of the network. In diagram 700, a user has selected a "short TX time" option as the desired performance metric. In the "short TX time" mode, modeling engine 102 determines a recommended pathway for the data transfer to traverse from a user-specified sender (specified at input box 552) to a user-specified receiver (specified at input box 554) for a given file size (specified at input box 757). The recommended pathway is determined based on the pathway that is predicted to take the least amount of transmission time. As used herein, the term "transmission time" may refer to an amount of active transmission time, corresponding to the amount of time that data is being actively transferred from one node to another, and not including the amount of time (if any) that any intermediate node stores the data. In another example, the term "transmission time" may refer to the total amount of transmission time, including the amount of time (if any) that any intermediate node stores the data. Whether the transmission time that is used by modeling engine 102 should include the storage time may be specified by user input or set to a default value such as a binary flag value, for example. As in diagrams 500a-500b, the user selects button 558 to run the model to view the output of modeling engine 102. After the model is run, output 759 is displayed. When the selected performance metric is "short TX time," output 559 includes the optimal path over which the data transfer should traverse to minimize the transmission time of the data transfer.

For example, modeling engine 102 may select the recommended network path (or pathway) from a set of candidate network paths. In particular, each of the candidate network paths may be assessed according to the specified performance metric to obtain a score. The score may be representative of an amount of transfer time, and the candidate network path that is associated with the lowest transfer time (or the highest score) may be selected as the recommended pathway. In another example, the first candidate network path that is assessed to have a transfer time below a threshold (or a score above a threshold) may be provided as the recommended pathway.

As shown in FIG. 7, output 759 includes a recommended network path. In general, output 759 may include any number of recommended network paths, such as those paths associated with transfer times below a threshold or with scores above a different threshold, for example. Furthermore, output 759 may include other metrics, such as an amount of storage that is required to facilitate the data transfer along the recommended network path(s). For example, output 759 may provide an amount of storage recommended to be utilized at any one or more of the nodes along the recommended network path. In some embodiments, output 759 may also include recommended amounts of time to hold the data at one or more nodes along the network path.

FIGS. 5-7 are exemplary displays of a user interface for different desired performance metrics. The performance metrics used in accordance with the disclosure may further include transmission time, wait time, and response time. As described in relation to FIG. 7, the transmission time may correspond to the maximum amount of time that a network is utilized during the data transfer. For example, if the transfer from the sender to an intermediate server is two hours, and the transfer time from the intermediate server to the receiver is one hour, the transmission time may correspond to a function of the sender's transfer time and the receiver's transfer time. In some embodiments, the transmission time is the maximum of the sender's transfer time and the receiver's transfer time. Another performance metric, the wait time, corresponds to an amount of idle (i.e., no transmission) time. For example, the sender's wait time may correspond to the number of hours between the time the transfer is initiated from the sender and completion of transmission from the sender's LAN. In another example, the receiver's wait time may correspond to the number of hours between the time the transfer is initiated from the sender and completion of transmission at the receiver. Another performance metric, the response time, corresponds to an amount of time between the time the transfer is initiated from the sender and completion of the transmission. In particular, the response time includes the wait time in addition to the transmission time. In some embodiments, the unit in time of the performance metrics is based on a number of hours. For simplicity, the time is rounded up to the next highest hour or rounded to the nearest hour.

Figure 8:
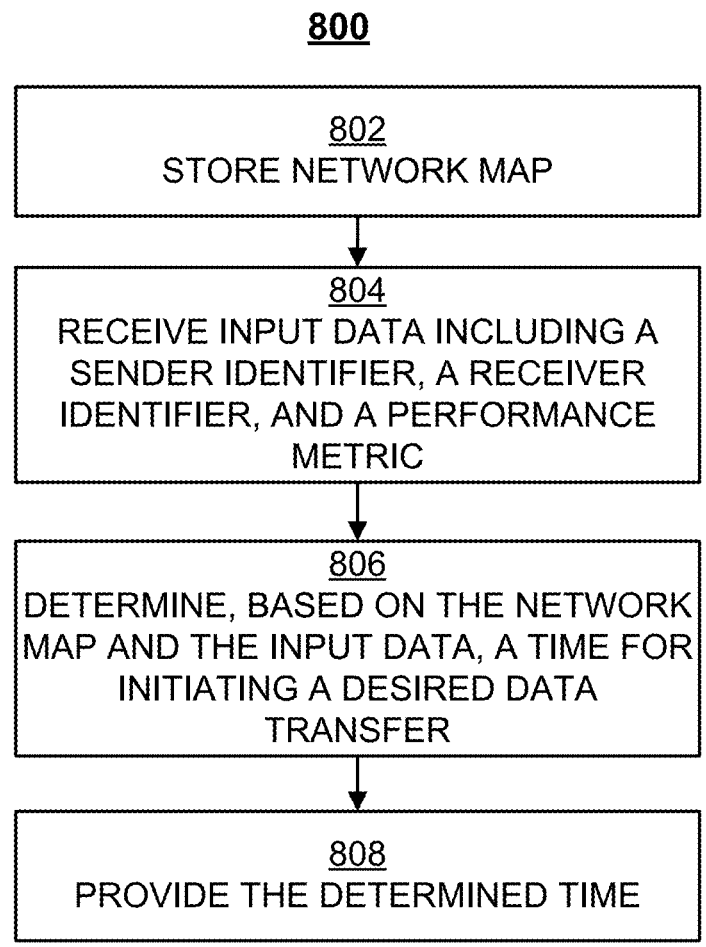
FIG. 8 is a flow chart of a method for providing a suggested time for initiating a data transfer, according to an illustrative implementation of the disclosure.
Figure 9:
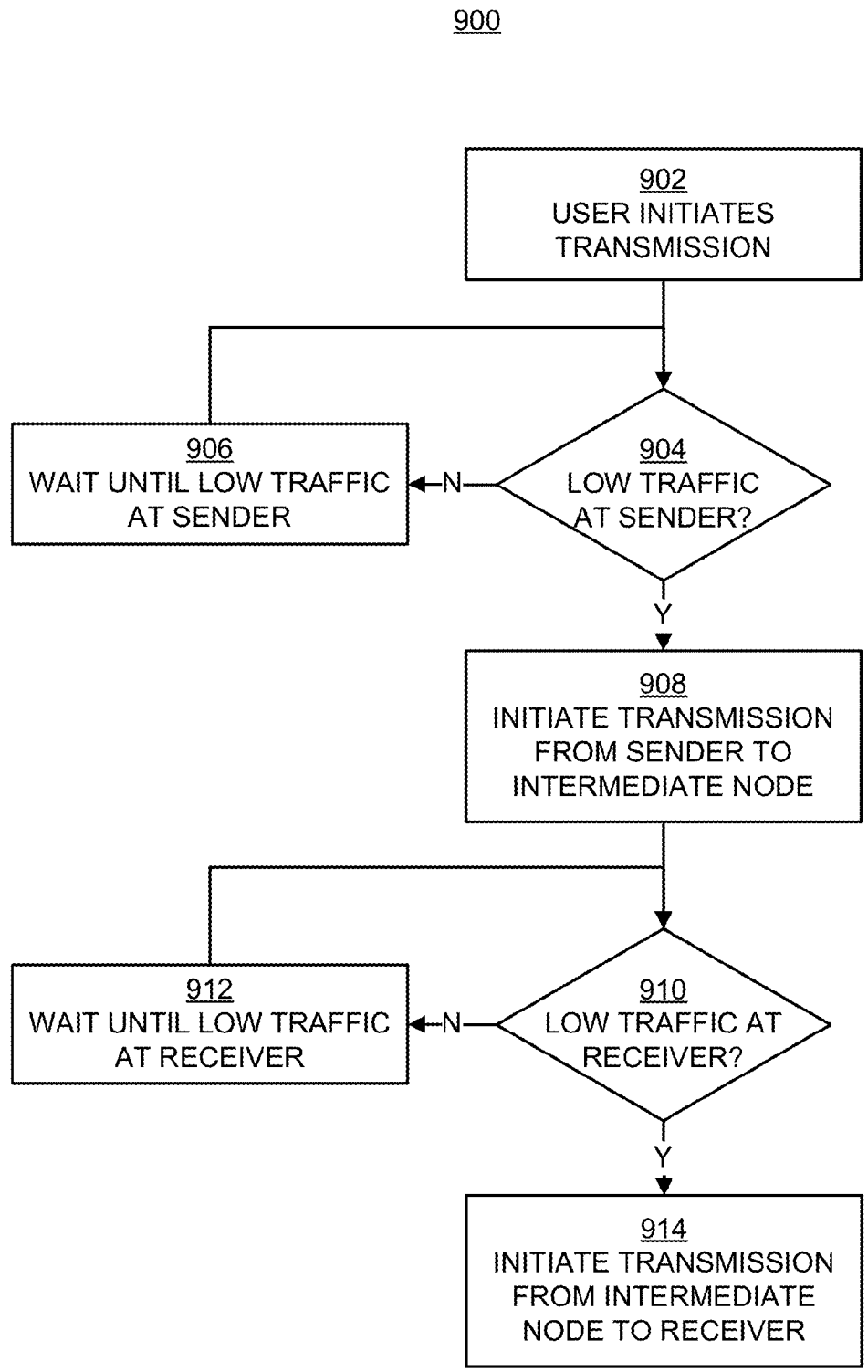
FIG. 9 is a flow chart of a method for controlling a data transfer, according to an illustrative implementation of the disclosure.

FIGS. 8-9 are flow diagrams of methods for providing one or more recommended parameters for a data transfer process. In particular, FIG. 8 shows a flow diagram of a high level method 800 for receiving input data and performing a process to determine a recommended time to initiate the data transfer. Method 800 includes the steps of storing a network map (step 802), receiving input data including a sender identifier, a receiver identifier, and a performance metric (step 804), determining, based on the network map and the input data, a time for initiating a desired data transfer (step 806), and providing the determined time (step 808). As described in relation to FIG. 1, the network map stored at step 802 may include information about networks 110 such as the locations of various nodes 111 and/or node identifiers identifying nodes 111. The network map may include specific information regarding the nodes or may simply include general information. In one example, a network map may include the specific identifiers for each node and stores a precise location of each node. In another example, a network map is a time zone map, which includes just the time zone of a number of nodes, and a routing protocol may be recommended based just on the respective time zones. In this case, the network that is represented by the network map is a time-zoned flow network. In particular, it may be desirable to transfer the data during the sleep portion of the sleep-wake cycle. In this case, the time zone information is relevant for determining a routing protocol that is suitable for recommendation. An example of a network map that is a time zone map including just the time zone of the nodes is shown in FIG. 26. In particular, the bandwidth availability across the globe is based on time zones. During the day, bandwidth availability of a location changes based on the time zone in which the node is located. The determining at step 806 may then be determined based on the time zones specified in the network map, the time zone of the sender, the time zone of the receiver, or any combination thereof.

FIG. 9 shows a flow diagram of a method 900 for controlling a data transfer. Method 900 includes the steps of a user initiating a transmission (step 902), determining whether there is low network traffic at the sender (decision block 904), and if not, waiting until there is low network traffic at the sender (step 906). When the sender network enters a period of low traffic, the transmission is initiated from the sender to an intermediate node (step 908), and method 900 further includes determining whether there is low network traffic at the receiver (decision block 910). If not, method 900 waits until there is low network traffic at the receiver (step 912), and when there is low network traffic at the receiver, the transmission from the intermediate node to the receiver is initiated (step 914).

In some embodiments, transmission at the sender (or receiver) even during times of high network traffic at the sender (or receiver). In this case, modeling engine 102 may determine that most of the data has already been transferred, and only a small amount of data remains to be transferred. Thus, the problem then reduces from a bulk data transfer problem to a standard data transfer problem, which may have different performance metrics or criteria for evaluating a recommended routing protocol.

In some embodiments, the network path from the sender to the receiver does not include an intermediate node. In this case, modeling engine 102 may determine that the sender and the receiver are in the same time zone, and that no intermediate node is necessary. Thus, the data transmission occurs directly from the sender node to the receiver node, and decision blocks 904 and 910 may be combined to identify times when both the sender node and the receiver node have low network traffic (or high bandwidth availability).

In some embodiments, the network path from the sender to the receiver includes more than one intermediate node. In this case, additional steps may be added to method 900 between step 908 and decision block 910. Specifically, the additional steps may include determining whether there is low traffic at a next intermediate node. If not, method 900 may wait until the next intermediate node has low traffic before initiating the transmission from the previous intermediate node to the next intermediate node. These additional steps may be repeated any number of times, for any number of intermediate nodes that lie on the network path from the sender to the receiver.

FIG. 10 is a diagram of a network layout between a campus network and a shared data center in a nearby metropolitan area. As shown in FIG. 10, the campus LAN includes a 1 Gb/s link from each department to a campus router, but in general, different departments may use links with different speeds. A 10 Gb/s link connects the campus routers to the WAN of the metropolitan data center, and beyond this link, the university may lease bandwidth from various internet service providers. For data transfers originating at the campus network, when big data leaves the LAN, the data traverses the WAN, which typically has faster links than the LAN. The next bottleneck for the data transfer may then occur at the LAN of the receiver.

According to an embodiment of the disclosure, the traffic patterns at a LAN is predictable because it may be driven by the end users' sleep-wake cycle, as shown in FIGS. 11-12. To optimize performance, modeling engine 102 is configured to use the predictability of the traffic patterns at LANs to suggest parameters for the data transfer, such as a suggested initiation time or a suggested pathway over which the data transfer should take place.

FIGS. 11-12 are diagrams of bandwidth usage for a typical week (FIG. 11) and a typical day (FIG. 12) on a campus network such as the campus LAN depicted in FIG. 10. The weekly traffic distribution is approximately periodic with a period of one day. Furthermore, the daily or diurnal traffic pattern of low and high internet traffic shows that there is network availability, or available bandwidth, for large file transmissions during the early morning hours, such as from about 1 AM to about 10 AM. The campus LAN traffic patterns mimics the sleep-wake cycle of the end users, where the temporary decrease in usage around 6-7 PM reflects dinner time.

Adding LAN bandwidth is not always sufficient to facilitate the transfer of large data. In particular, when the campus LAN is upgraded by providing more bandwidth, the additional bandwidth is utilized by applications such as streaming video where more bandwidth translates to better quality. Thus, the end users may immediately consume all or most of the additional bandwidth, and other mechanisms that may take into account the sleep-wake cycle of the end users at the LANs of the sender and receiver should be used to facilitate transmission of large data.

FIG. 13 shows a table 1300 including network utilization percentage and bandwidth availability for the various hours of a typical day. For example, at 4 pm, the maximum bandwidth is 15 Mb/s, and the bandwidth availability shown in table 1300 is the same for the sender and the receiver, though in general, the sender and receiver may have different bandwidth availabilities throughout the day. However, it may be reasonable to assume that the sender and receiver have similar or identical bandwidth availability profiles because the traffic patterns are modeled after human behavior, which may be the same regardless of the location or time zone of the end users. While the bandwidth availability profile for the sender may generally resemble the bandwidth availability profile for the receiver, the installed bandwidth at the sender and receiver networks may be different. For example, during low traffic hours, the bandwidth at the sender's LAN may be 5 Gb/s, while the bandwidth at the receiver's LAN may be 1 Gb/s. Similarly, the bandwidth availability profile for any intermediate nodes may also be assessed. It is generally desirable to transfer data during periods of low traffic, or high bandwidth availability. Thus, for network transfers of large data sets, it may be desirable to recommend to initiate the data transfer at a time that is close to the beginning of such a period.

FIG. 14 is a diagram of a end-to-end model for file transmissions. The model shown in FIG. 14 is an end-to-end model with multiple transmission streams between a sender and a receiver. Since multiple concurrent streams are opened between the two end users, different parts of the file may be transmitted concurrently. Opening multiple streams distributes the internet load if a different network route is used for each stream. However, the multiple streams converge at both LANs of the end users, which strains the capacity of congested LANs. In the end-to-end model shown in FIG. 14, the rate of transmission is determined by the minimum bandwidth along the path.

FIG. 15 is a diagram of a store-and-forward model for file transmissions. The model shown in FIG. 15 combines the parallel and store-and-forward approaches. The store-and-forward model takes advantage of maximum installed bandwidth on the LANs of the sender and the receiver without affecting the bandwidth used by other users. According to the store-and-forward model, multiple transmission streams are opened during times of low traffic. When the sender and the receiver are in the same time zone, a direct transmission from sender to receiver is feasible. However, when the sender and the receiver are in different time zones, then the periods of low traffic at the sender and receiver may not coincide. In this case, the file may be transmitted from the sender to one or more staging servers in the internet zone. Depending on the internet configuration between the sender and the receiver, the file may be transmitted to a single staging server via multiple streams or the file may be divided and parts of the file are transmitted concurrently to multiple staging servers. The steps of the store-and-forward model is described in more detail in relation to FIG. 9.

FIG. 16 is a diagram of a simulator configuration map. The performance of the end-to-end model shown in FIG. 14 and the store-and-forward model shown in FIG. 15 was evaluated using OPNET and a simulator. OPNET is a commercial simulator capable of simulating a wide variety of network components and workloads. The map shown in FIG. 16 corresponds to an experimental setup for emulating the workload of the most popular traffic classes found on an LAN. In particular, the left side of the map represents the sending campus network and its client/server machines. The right side of the map represents the receiving campus network and its client/server machines. The staging server in the middle of the map is utilized when the sender network and the receiver network have non-synchronous low demand periods. In the experiments, for each network, three client/server machine pairs are set up to emulate the workloads. The workloads of the three popular traffic classes were varied to represent the background utilization of the shared internet connection at various times of the day. A fourth server is used to simulate big data transfers. The staging server handles staging for big transmissions. The results of the experiments performed in accordance with the simulator of FIG. 16 are shown in FIGS. 17-21.

Figure 17:
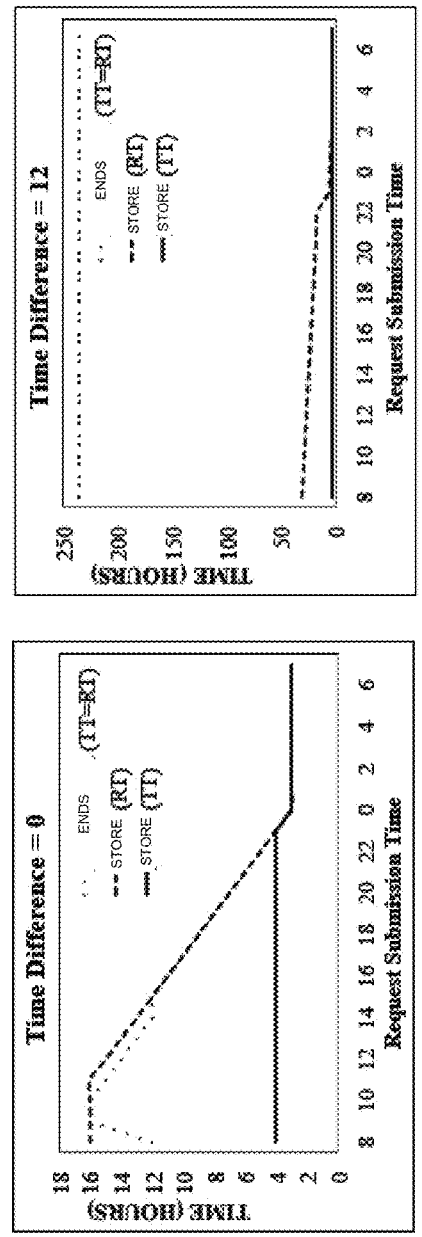
FIG. 17 shows diagrams of transmission time and response time of the store-and-forward model as a function of the initiate time, according to an illustrative implementation of the disclosure.

FIG. 17 shows diagrams of transmission time (TT) and response time (RT) of the store-and-forward model as a function of the initiate time. The initiate time corresponds to the time the user requests the transfer of a data set. For the data shown in FIG. 17, the size of the data set is 1 TB. The time difference may also be varied, such that the left plot shows the data when the time difference between the sender and receiver is 0 (or in the same time zone), and the right plot shows the data when the time difference between the sender and receiver is 12 hours. The data shown in FIG. 17 indicate that the performance of the store-and-forward model is always at least as good as the end-to-end model, and the store-and-forward model's performance is better than the end-to-end model's performance during peak traffic hours. Furthermore, the transmission time of the store-and-forward model is largely invariant to the initiate time and the time difference, and the response time is sensitive to the initiate time and less sensitive to the time difference. However, the transmission time of the end-to-end model is sensitive to both the initiate time and the time difference.

Figure 18A:
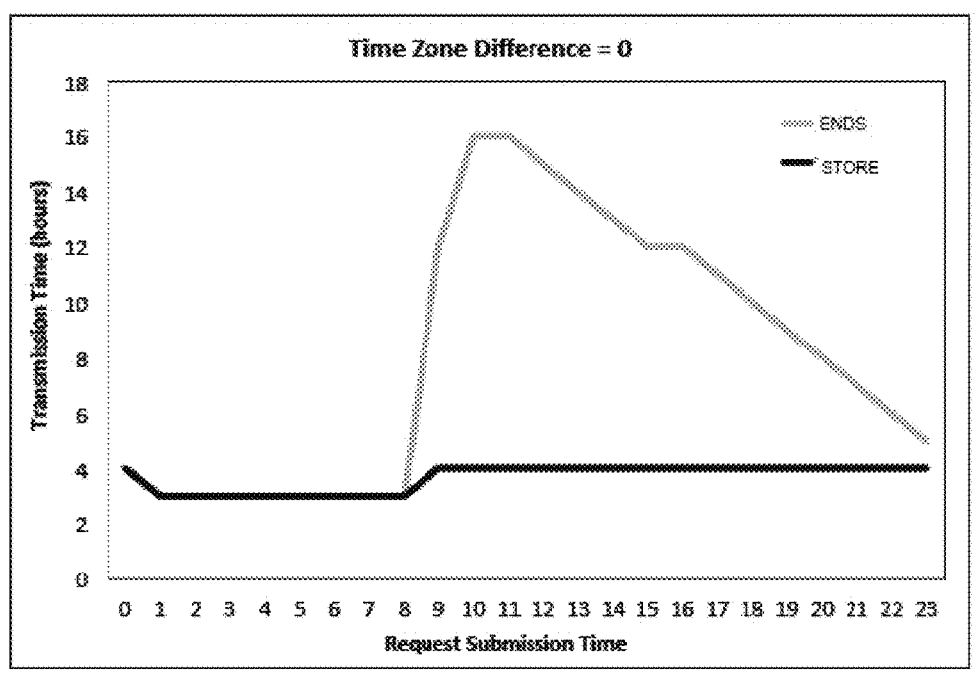
Figure 18B:
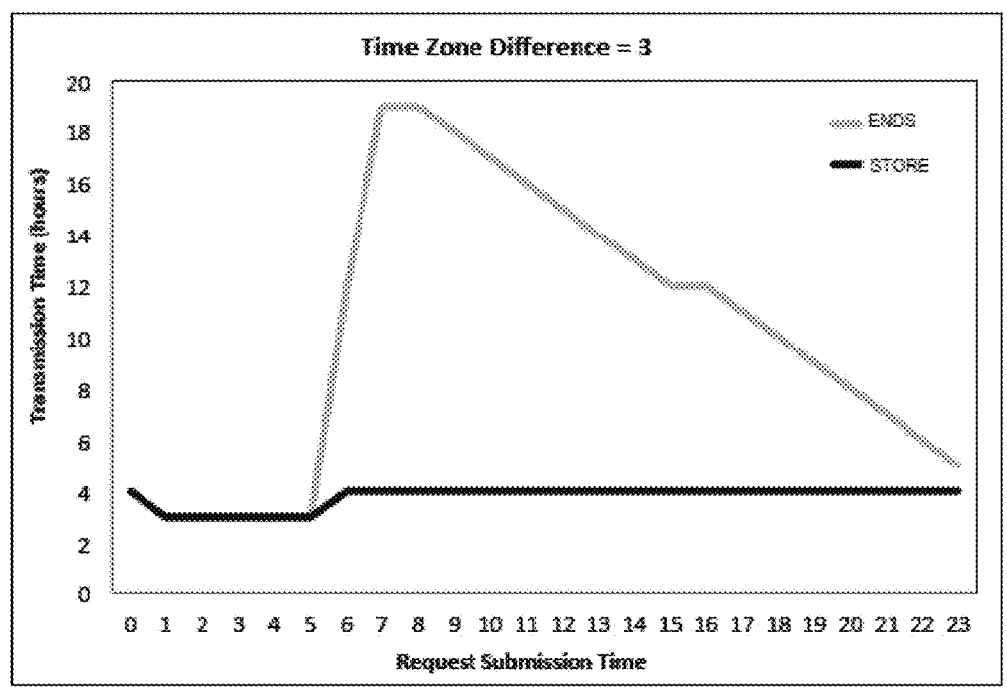
Figure 18C:
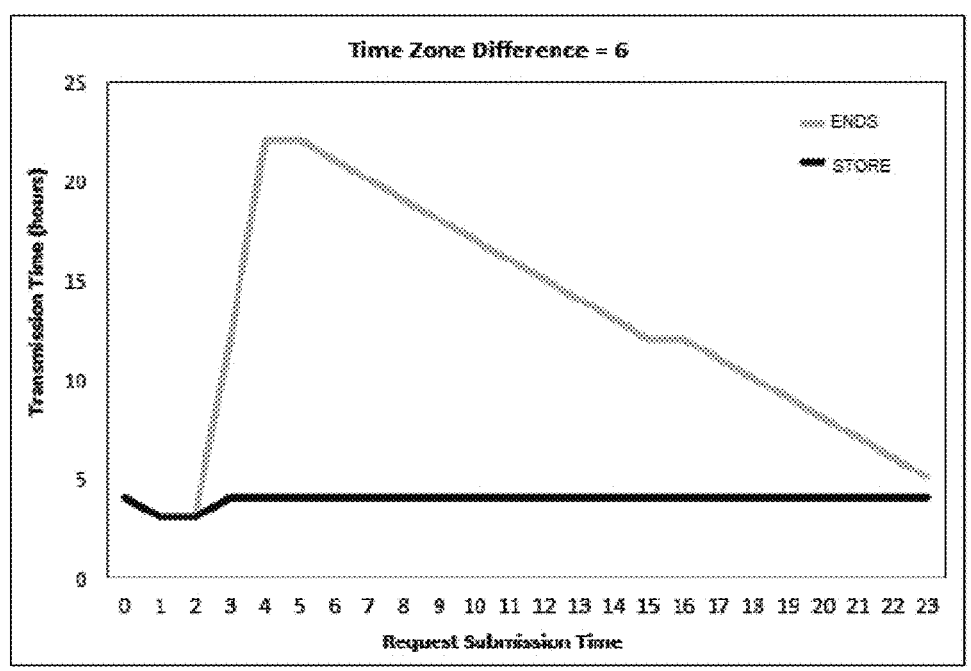
Figure 18D:
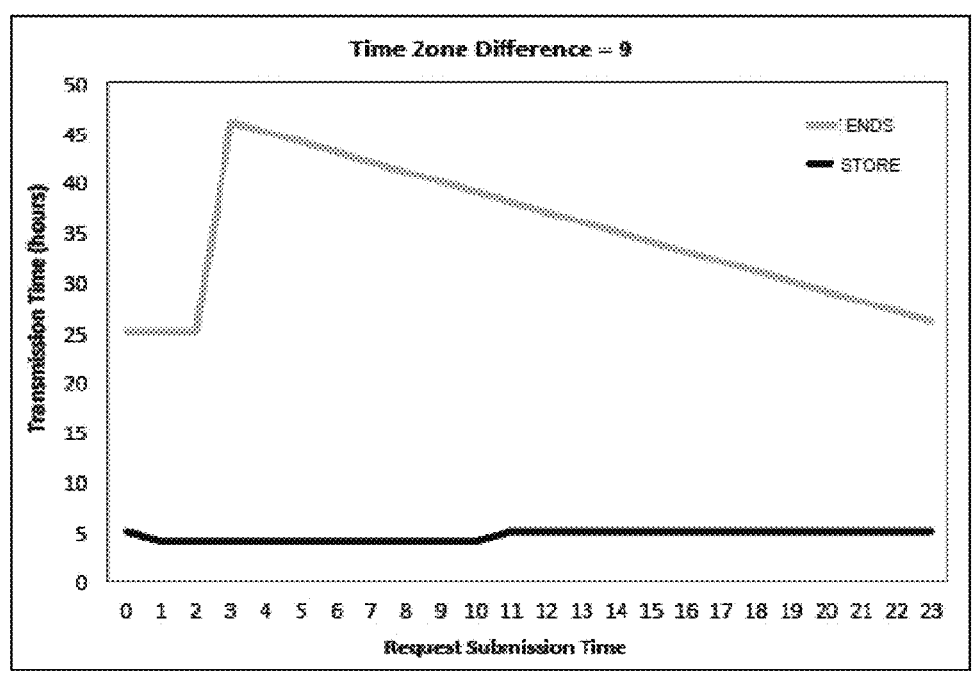
Figure 18E:
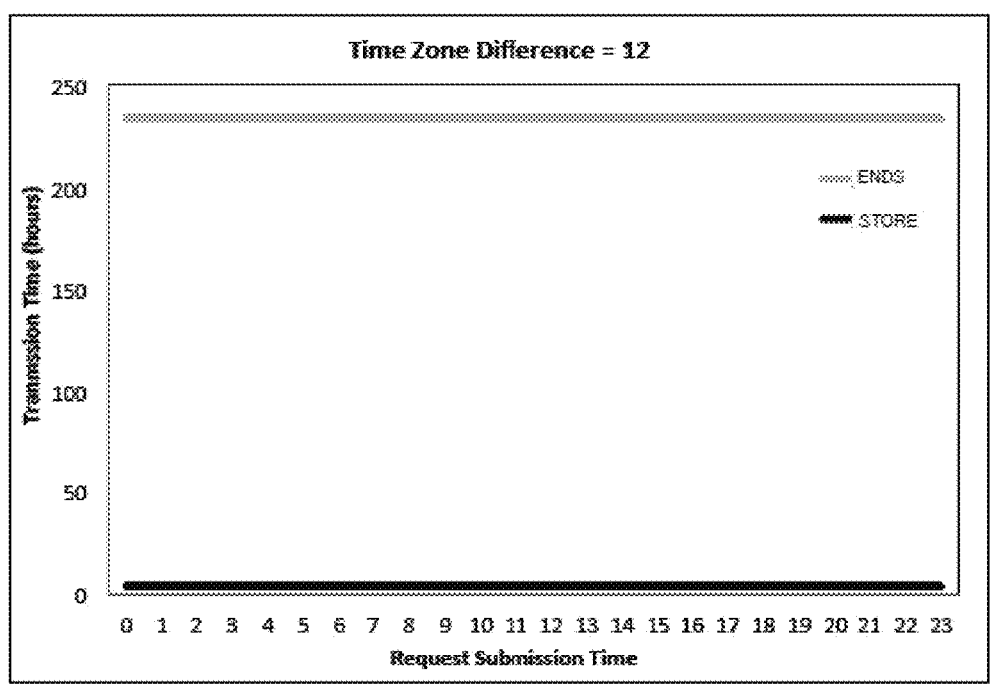
Figure 18F:
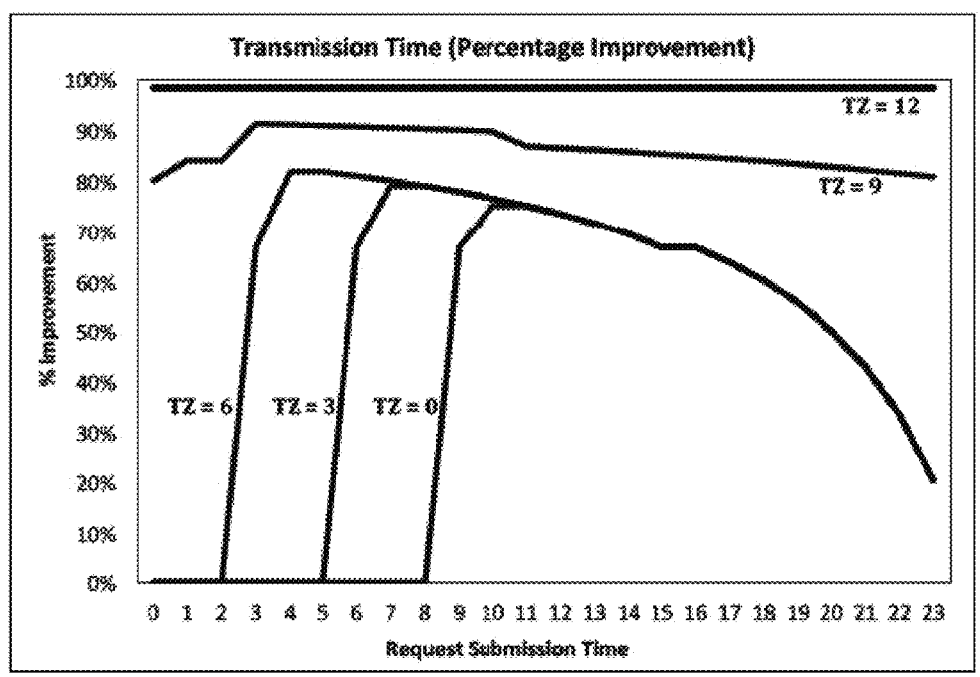

FIGS. 18A-F show diagrams of transmission time as a function of initiate time, where the different graphs correspond to different time differences between the sender and the receiver. As may be observed from FIGS. 18A-E, the end-to-end model and the store-and-forward model exhibit similar performance when the initiate time occurs during a low traffic period and when the time difference is small. FIG. 18F shows the percentage improvement in transmission time of the store-and-forward model when compared to the end-to-end model for the various time differences. As the time difference increases, the performance of the end-to-end model degrades, while the performance of the store-and-forward model remains relatively unchanged. Thus, there is a 100% improvement in transmission time of the store-and-forward model when the time difference is 12 hours. In particular, when the time difference is 12 hours, the sender and the receiver are in orthogonal time zones, such that there is no overlap of low traffic times at the sender and the receiver. Thus, since the end-to-end model does not take into account the times of low traffic at the end users, the end-to-end model transmits the data over links with primarily small bandwidths, and the transmission time is large. FIG. 19 shows diagrams of transmission times for the end-to-end model and the store-and-forward model as a function of time difference between the sender and the receiver for a data transmission initiation time of 12 AM (left) and 12 PM (right). The data in FIG. 19 indicate that the performance of the end-to-end model substantially decreases as the time difference between the sender and the receiver approaches 12 hours.

FIG. 20 shows diagrams of response times for the end-to-end model and the store-and-forward model as a function of transmission initiation time for no time difference (left) and a time difference of 9 hours (right). For the end-to-end model, the response time is the same as the transmission time. Both the end-to-end model and the store-and-forward model perform better when the time difference is zero (left). However, when the time difference is 9 hours (right), the amount of wait time in the store-and-forward model increases, while the end-to-end model has to use low bandwidth transmission because the time zones between the sender and receiver are not synchronized.

FIG. 21 shows diagrams of the transmission time at the receiver's LAN when the receiver has four times as much bandwidth as the sender. For the end-to-end model, the faster transmission rate at the receiver has no impact on performance. This is also the case for the store-and-forward model when the time difference is zero (left). However, when the time difference is 18 hours (right), the performance of the store-and-forward model improves because the store-and-forward model can take advantage of the additional bandwidth at the receiver when the time difference is greater than zero.

FIGS. 17-21 show diagrams of experimental results comparing the end-to-end model of FIG. 14 to the store-and-forward model of FIG. 15. In accordance with an embodiment of the disclosure, theoretical analysis may also be performed to better understand the experimental results.

Several variables may be defined to facilitate the theoretical analysis. In particular, the transmission time may be referred to as sendTT (the number of hours the sender's LAN is busy transmitting the file) and recTT (the number of hours the receiver's LAN is busy transmitting the file). TT may refer to the maximum number of hours that the network is utilized during the transmission of the file's data. In general, TT may be a function of sendTT and recTT, such as the maximum of sendTT and recTT. The wait time may be referred to as sendWT (the number of idle hours between the time of initial transmission and transmission completion from the sender's LAN) and recWT (the number of idle hours between the time of initial transmission and transmission completion at the receiver's LAN). The response time may be referred to as RT (the number of hours between the time of initial transmission and the completion of the transmission. SendBW and RecBW represent the smallest sender link bandwidth and the smallest receiver link bandwidth, respectively. SendBW and RecBW may correspond to arrays SendBW[i] and RecBW[i], where i represents the hour of the day $0 \leq i \leq 23$ where hour 0 is 12 AM, hour 1 is 1 AM, . . . , and hour 23 is 11 PM. SendBW and RecBW may be used for determining an optimal initiate time for initiating the transmission, or an initiation time that results in performance exceeding some threshold. SendBW[i] and RecBW[i] represent the smallest available bandwidth (in Mb, for example) at the LAN of the sender or receiver during hour i. Examples of values for SendBW[i] and RecBW[i] are shown in the table of FIG. 13. InitiateTime=j where $j \in \{0, 1, 2, \ldots, 22, 23\}$ and corresponds to the hour at which the user initiates the transfer.

When compared to the end-to-end model, the store-and-forward model is preferable when it is desirable to transmit large data over large distances that span different time zones and varying network capabilities. The store-and-forward model is stable and not sensitive to distances and bandwidth differential between sender and receiver LANs. The experimental and theoretical analyses described herein demonstrate that the store-and-forward model performs far better than the end-to-end model. This work combines the end-to-end approach and the store-and-forward approach to find a solution to big data transmissions.

The above analysis is focused on the network availability of the end users, or at the LANs of the sender and the receiver. However, the analysis can be extended to include modeling of the intermediate networks that participate in the transfer process. FIGS. 22-25 show example diagrams and flow network graphs that illustrate the extension of this analysis to include the intermediate nodes. In particular, the internet may be modeled as a collection of independent networks, where each network is an AS. Bulk transmission is the routing of a large number of packets from the sender's AS to the receiver's AS via one or more transit ASs. There may be multiple paths between any sender and receiver, and the routing may occur at multiple levels. In an example, there may be two levels: routing within each AS (intra-AS routing) and routing between ASs (inter-AS routing). Routers within an AS may use an Interior Gateway Protocol for determining paths within the AS, and the intra-AS routing protocols may be driven by metrics such as hop count. In contrast, routers between ASs use the Border Gateway Protocol for exchanging routing information between ASs. Because the ASs are independent administrative entities, the traffic exchange between two ASs is controlled by administrative or pricing policies, and the inter-AS routing is driven by business policy constraints.

While a standard internet transmission may have a size on the order of 100 MB, a bulk internet transmission may be significantly larger, such as on the order of 100 GB. Standard internet transmissions may be routed using routing protocols that use a combination of minimal hop count and business cost. If performance is measured by metrics such as throughput (or transmission time), then bulk transmissions could perform very poorly using the routing schemes based on standard internet transmissions. For example, with 20 Mb/s and 2 Gb/s links, a 100 MB file is transmitted in less than a minute over either link. On the other hand, a 100 GB file takes 11.36 hours over the 20 Mb/s link and less than 7 minutes over the 2 Gb/s link, a reduction of 99% of transmission time. For bulk transmissions, routes with maximum capacity (throughput) are optimal. Thus, the optimal route for bulk transmissions is not necessarily the route selected by standard internet routing. Consequently, the routing of bulk transmissions should be treated differently from routing of standard internet transmissions.

For bulk transmissions, the performance metric that is of relevance is the throughput. When the transmission has a high throughput, the time to transmit a bulk data set is small. Therefore, the objective of a bulk routing algorithm is to find the highest capacity links between the sender and the receiver. Multiple transmission paths can be opened between sender and receiver with concurrent transmission along some or all paths. For example, for two transmission paths between the sender and the receiver: sender-transitA-receiver, sender-transitB-receiver. If the sender and the receiver each have 2 Gb/s links but the transit networks only have 1 Gb/s links, then by opening both transmission paths between sender and receiver, it is possible to make use of the maximum 2 Gb/s capacity.

An issue that may be addressed by the bulk routing protocols is the shared nature of the internet. Bulk transmissions share the internet with other applications; many of these applications are real-time and have quality of service (QoS) requirements of low latency and low jitter. During certain hours, there is heavy bandwidth usage from these time-critical applications. Bulk transmissions are delay tolerant, so priority may be given to these time-critical applications by ensuring that bulk transmissions only use of the remaining "free" bandwidth. Therefore, an objective function of bulk routing protocols may be modified to find the links with the highest free capacity between the sender and the receiver.

While the physical capacity of a link may be fixed, the free capacity of the link may be variable. Free capacity is a function of bandwidth usage: the higher the bandwidth usage, the lower the free capacity. The bandwidth usage in an AS has a diurnal wave pattern, as shown in FIGS. 11, 12, and 22. For a given network, the valleys in bandwidth usage correspond to peaks in free capacity. For example, a network with 10 Gb/s capacity may limit bulk transmissions to 50 Mb/s during peak bandwidth usage times, but allow 8 Gb/s during the low bandwidth usage times. For peak or optimal performance, bulk transmissions may be scheduled during valleys in the bandwidth usage.

The bandwidth usage cycle follows the users' sleep-wake cycle, which is dependent on the location of the sender AS and the receiver AS. If the sender and receiver are situated in different time zones, then the high free capacity times of the sender, receiver and transit ASs do not necessarily coincide. Consequently, even if the sender, receiver, and transit networks all have equal physical capacity links and similar bandwidth usage pattern, it is still possible that the throughput of the bulk transmission is far below the peak free capacity of the ASs when the sender and receiver are in different time zones. The reason is that the throughput of an end-to-end routing algorithm depends on the smallest free capacity link on the route. For example, suppose the sender and receiver networks have 2 Gb/s free capacity during the hours 1:00 AM-8:00 AM, and that during the rest of the day, bulk transmission is limited to 20 Mb/s (set by the network administrators to ensure QoS of time-critical internet applications). Assume that the transit ASs have ample bandwidth. If there is a 8 hour time zone difference between the sender's AS and the receiver's AS, then the high capacity times at the sender and receiver are out of sync, and transmission bandwidth is 20 Mb/s, not 2 Gb/s (for a total transmission time of 11.36 hours).

To overcome temporal non-synchronization of free capacity at sender/receiver ASs, store-and-forward routing protocols may be used for bulk transmissions. Instead of directly transmitting the bulk dataset from sender to receiver, datasets are temporarily stored in staging servers along the path until bandwidth opens up in the forwarding AS. In the previous example then, with a store-and-forward approach, a 100 GB file would be transmitted from the sender AS to a staging server in a transit AS, and the transmission would take 6.67 minutes at 2 Gb/s. The dataset is later transmitted to the receiver AS during its high free capacity time of 2 Gb/s. Thus, the actual transmission time at any network is 6.67 minutes for a total transmission time of 13.34 minutes, as opposed to 11.36 hours with the end-to-end approach.

The present disclosure develops a mathematical framework for bulk transmission routing. The internet can be represented by the sender AS, the receiver AS, and the transit ASs that connect them. The key feature of an AS that is relevant to bulk transmissions is the total physical bandwidth link to the internet (i.e., to other ASs). For example, if a sender AS has a single 10 Gb/s link to a transit AS, then bulk transmission cannot exceed this capacity; or, if a transit AS on the path from sender to receiver has maximum of 5

Gb/s incoming link and 50 Gb/s outgoing link, then the throughput routed via this transit AS cannot exceed 5 Gb/s.

Routing of bulk transmission via the internet can be modeled with a flow network, such as those shown in FIGS. 23-25. The flow networks in FIGS. 23-25 may be used as a network map for modeling engine 102 to predict the availability of various nodes and networks, including the availability at the sender node, the receiver node, and any intermediate nodes. The sender's AS is represented by a vertex "s" with outgoing edges representing outflow to transit vertexes. Each transit AS is modeled by a vertex "Tr#" and one or more incoming and outgoing edge(s), where each edge has capacity equivalent to the internet bandwidth to another AS in its path from sender to receiver. The receiver's AS is represented by a vertex "r" with incoming edge(s). For store-and-forward transmission, the model may assume that each AS has unlimited storage capacity, but in general, a maximum capacity may be used for each AS. Thus, the nodes and the edges are each associated with a capacity. The sender may be considered as the source and the receiver may be considered as the sink in the directed flow graph. The present disclosure thus reduces the transmission of bulk data to a maximal flow problem, in which the objective is to find the maximum flow from the source to the sink under the constraint that the capacities of the edges and nodes cannot be exceeded.

The flow network as described above models a static internet because the edge capacities are fixed. However, in general, the links have varying free capacities, where an AS's free capacity follows a diurnal wave pattern, such as those shown in FIGS. 11, 12, and 22. As described above, the distribution matches the sleep-wake cycle of the end users, such that there is more bandwidth during the early AM hours and less bandwidth during the PM hours. The distribution of free capacity captures the impact of internet users and their workload on bulk transmissions.

In order to model bulk transmissions that occur over a dynamic internet, the present disclosure uses time-varying flow networks in which the capacities of the edges vary with time-of-day. The source and sink vertexes of the flow network model the sender and receiver ASs, respectively, while the intermediate vertexes model the transit ASs. Each vertex, except the sender "s", has one or more incoming edges that represent the incoming internet flow into the AS from other ASs along a path from sender to receiver. Each vertex, except the receiver "r", has one or more outgoing edges that represent the outflow from the AS to other ASs in the internet routing path. Since ASs experience diurnal bandwidth usage, the modeling covers a period of 24 hours starting from the time that the transmission is initiated.

The routing problem of bulk transmissions may be written in the mathematical framework of flow networks by using the following definition. Bulk transmission routing is modeled by a set of vertexes representing the ASs, E is the set of edges representing internet links between the ASs, $b(x, t) \geq 0$ is the storage capacity of vertex $x \in V$ at time t, and $b(x, y, t)$ is the free bandwidth capacity of edge $(x; y) \in E$ at time t. The time t is relative to transmission initiation time, so t is equal to the transpired time since initiation at $t=0, 1, 2, \ldots, T$, where T is the cycle time and is the maximum allowable flow time from the sender vertex s to the receiver vertex r.

Thus, $b(x, y, t) \geq 0$ is the maximum amount of bulk data flow from x to y, when the flow departs from x at time t. The clock starts when bulk transmission is initiated at $t=0$. As used herein, the unit for time is one hour, but in general, can be 1 second, 5 minutes, 1 hour, or any appropriate time interval. Because one hour is chosen as the time unit, the clock stops at the end of the hour $T=23$ since the distribution of free capacity has a diurnal wave pattern. As an example, $b(x, y, 5)$ is the (x, y) edge capacity at hour 5, which is 6 hours after the transmission is initiated.

The vertex capacity $b(x, t)$ is relevant only to flows that wait at the vertex when there is insufficient bandwidth to move the data forward. This happens when the outflow capacity is less than the sum of inflow and stored capacity at vertex x during time t. The edge capacity $b(x, y, t)$ represents the capacity along the edge (x, y) from the start of the hour t until the end of the hour t. The total free capacity is the integral of the wave function representing free bandwidth during the hour t. From the perspective of the internet, this represents the amount of bulk data that can be transmitted from AS x to AS y during the 60 minutes of the hour t. For example, if administrators of AS x only permit fixed 20 Mb/s during hour 8 (relative to when the transmission is initiated) to AS y, then $b(x, y, 8)=9$ GB.

FIG. 23 shows a time-varying network N with cycle time T set to 5. The node s is the sender vertex, the node r is the receiver vertex, and the nodes Tr1, Tr2, and Tr3 are the transit vertexes. The two numbers inside each pair of brackets associated with an edges (x, y) are t and $b(x, y, t)$, respectively. For example, the (0, 2) near the edge (s, Tr1) means that during hour 0 (the time at which the transmission is initiated), at most, two units of bulk data can be transmitted from s to Tr1. Furthermore, if bulk transmission is not permitted along an edge (x, y) at a certain hour t, $t \leq T$ (i.e., $b(x, y, t)=0$), then the bracket is not shown in the diagram. For example, the edge (s, Tr1) has no capacity set aside for bulk transmissions during hours 2, 3, 4, or 5, so these are not shown.

A path p of length k in N is a sequence $p=<v_0, v_1, v_2, \ldots, v_k>$ of vertexes such that $v_0=s$, $v_k=r$, and $(v_{i-1}, v_i) \in E$ for $i=1, 2, \ldots, k$. Let $f(x, y, \tau)$ be the value of the flow departing the node x at time $\tau$ to traverse the edge (x, y), and let $f(x, \tau)$ be the value of the flow stored in the vertex x at the end of time $\tau$. Let $\lambda$ specify a set of paths from the sender to the receiver, and $f(\lambda, t)$ be the total flow with solution within the time limit $t \leq T$. Then, it follows that $$f(\lambda, t) = \sum_{(x,r) \in E, \tau \leq t} f(x, r, \tau)$$

and $$f(\lambda, t) = \sum_{(s,x) \in E, \tau \leq t} f(s, x, \tau) - \sum_{x \in V - \{s,r\}} f(x, t)$$

where $$f(x, t) = \sum_{(v,x) \in E, \tau \leq t} f(v, x, \tau) - \sum_{(x,v) \in E, \tau \leq t} f(x, v, \tau)$$

From the above, it follows that $f(\lambda, t)$ is the value of flows sent from node s to node r within the time limit T. For bulk transmission routing, $f(s, 0^-)$ is the size of the bulk data set at the sender node just before transmission at time $t=0$. $f(\lambda, T)$ is the size of the data set that can be transmitted from sender s to receiver r using routing paths $\lambda$ within time T.

The bulk transmission routing protocols address the following optimization problems: (1) maximize the size of the bulk data set that can be transmitted from sender to receiver within a cycle period, and (2) minimize the time to transmit a bulk data set from the sender to the receiver. In the domain of flow networks, the two problems translate to the following objective functions: (1) Generate $\lambda^{max}$ such that $f(\lambda^{max},$ T)≥$f(\lambda,T)$, ∀λ in N, and (2) For a given $f(s,0^-)$, generate $\lambda^*$, where $f(s,0^-)=f(\lambda^*,\tau)>f(\lambda,t)$, ∀λ in N when t<τ. The first objective function is equivalent to finding the maximum flow in a time-varying network. The second objective function is equivalent to finding the universal maximum flow in a time-varying network. Techniques for calculating the maximum flow and the universal maximum flow in time-varying flow networks may be used to compute the routing of transmissions over the internet.

The flow network approach as described herein may be used to model an end-to-end protocol as well as a store-and-forward protocol. In particular, for end-to-end bulk transmission, b(x,t)=0, ∀x∈V, and for store-and-forward bulk transmission, b(x,t)≥0, ∀x∈V. For store-and-forward bulk transmission, modeling engine 102 may assume that each AS has plentiful (i.e., infinite) storage. The above two objective functions may be solved in both end-to-end and store-and-forward contexts to find the maximum flow and universal maximum flow of the flow network shown in FIG. 23. A result from the solutions is that $f(\lambda_e,t) \le f(\lambda_s,t)$, ∀t≤T, where $\lambda_e$ corresponds to the end-to-end solution, and $\lambda_s$ corresponds to the store-and-forward solution.

Previously, the time of the initiation of the data transfer was a fixed input parameter. However, in general, the initiate time may be chosen to further maximize the objective function. In particular, let c(x, y, t) represent the free capacity along (x, y) at the local time t at the node x. The edge capacity for (x, y) in the flow network is represented by b(x, y, t), where t is the time relative to the transmission initiate time. Thus, b(x, y, t) is the edge capacity with relation to initiate time, while c(x, y, t) is the edge capacity with relation to the local time of the node x. Let l(x) represent the local time at x∈V when transmission is initiated at sender s. l(s) is the local time at the sender s when transmission is initiated. It follows that b(x, y, t)=c(x, y, (t+l(x)) mod 24), 0≤t≤23. Changing the initiate time transforms the flow network because the distribution of the edge capacity changes. FIG. 24 shows the flow network of FIG. 23 with the initiate time shifted by 3. If the flow network is mapped to a coordinate system with time and capacity on the axes, then shifting the initiate time is equivalent to a translation of the flow network. For the transformed flow network in FIG. 24, $f(\lambda_e, 3)=1$, $f(\lambda_e, 4)=2$, $f(\lambda_e, 4)=2$, $f(\lambda_e, 5)=5$, and $f(\lambda_s, 5)=12$. Thus, this transformation changes the maximal flow and the universal maximal flow.

The initiate time can be set to any hour of the day, and the flow network models the state of the ASs linking the sender and the receiver ASs for a 24 hour period from the initiate time. For each value of the initiate time, a transformed flow network exists and may be solved for maximal or universal maximal flow. Thus, the updated definition of the flow network modeling bulk transmission may be defined by a set of time-varying flow networks, N={$N^l$=(V, E, b)|l=0, 1, ..., T}, where V, E, b are as defined previously, and 1 is the local time at the sender s when transmission is initiated. When $f(\lambda, T, \theta)$ represents the flow in time T when transmission is initiated at sender s's local time θ, the objective functions for bulk transmissions for varying initiate time are: (3) Find $\lambda^{max}$ with initiate time θ such that $f(\lambda^{max}, T, \theta) \ge f(\lambda^{max}, T, 1)$, ∀0≤l≤T, l≠θ, and (4) For a given $f(s, 0^-)$, find $\lambda^*$ with initiate time θ such that $f(s, 0^-)=f(\lambda^*, T, \theta)>f(\lambda, t, 1)$, ∀0≤l≤T, l≠θ when t<τ. To solve the third and fourth objective functions, solutions may be identified for all 24 flow networks in the set N. For the original first and second objective functions, only a single flow network relating to the fixed initiate time may be solved.

However, for end-to-end transmission, the initiate time has no impact on the maximal flow. In particular, $f(\lambda_e^{max}, T, \theta) \ge f(\lambda^{max}, T, 1)$, where θ is the local time at s when transmission is initiated. While maximal flow for end-to-end is not dependent on the initiate time, universal maximal flow (i.e., the minimum time to transmit a data set) requires the fourth objective function. For store-and-forward, initiate time is relevant to both maximal flow and universal maximal flow.

The present disclosure develops a mathematical framework that maps bulk routing to the domain of time varying flow networks. With this mapping, the problem of routing bulk transmissions transforms to a maximum flow problem. However, there are challenges to using flow networks for bulk transmissions. For example, one issue is getting the input data to construct the flow network that underlies the bulk transmission. In order to use the maximal flow techniques, the underlying flow network from the sender's AS to the receiver's AS needs to be constructed. In order to build this model, data regarding the transit ASs that lie in the path from sender to receiver is required. In particular, for each AS, the amount of free capacity that is reserved for bulk transmissions during each hour is required for the model to be constructed. The ASs may be managed by independent organizations that are in the global telecommunications business. These organizations are unlikely to freely provide the data regarding free capacity. Even if the global telecommunication industry publicly reveals this information, there are other challenges. In another example, while bandwidth usage has a largely fixed diurnal wave pattern modeled along users' sleep-wake cycle, there are seasonal and day-of-week variations. For example, bandwidth usage over the weekend has a different distribution from that of the weekday bandwidth usage. Another challenge is that business deals between telecoms control the traffic flow between ASs. Therefore, the free capacity may be driven by business constraints rather than bandwidth availability. Consequently, the map of global internet bandwidth usage is dynamic and needs updates on a somewhat regular basis. The technique to generate bulk transmission routing is only as accurate as its underlying flow network. Without a reasonably accurate map of global bandwidth availability, it may not be feasible to construct an accurate underlying flow network.

Another challenge to using flow networks for bulk transmissions is the complexity of time varying flow algorithms. The algorithms that can solve the first and second objective functions described above have high computational complexity. The first optimization problem, namely, maximal flow, can be solved in polynomial time. However, the second optimization problem, namely, universal maximal flow, is NP-complete. The solutions for the third and fourth objective functions involve solutions to T flow networks and are also complex.

If the flow network is an inaccurate model of the internet (due to non-availability of reliable input data), then it is wasteful to run expensive algorithms to compute the optimal solution. There are two major roadblocks to computing the optimal solution for a bulk transmission. First, it may be difficult to get sufficient data to construct an accurate underlying flow network. Second, even if an accurate flow network is constructed, solving the time-varying flow network can be very complex. The first issue is inherent to the distributed nature of the internet and the autonomy of its components, and the second issue is inherent to the time-varying flow network underlying bulk transmission. Thus, finding an optimal bulk routing solution is sometimes an intrinsically intractable problem.

Because determining the optimal bulk routing solution is sometimes intractable, the present disclosure uses several heuristics to simplify the problem. As described above, a first challenge corresponds to a difficulty of getting accurate data regarding bandwidth availability of transit ASs. However, the sender AS and the receiver AS are typically stub ASs and do not permit transit traffic. Consequently, the sender AS and the receiver AS both display relatively stable traffic patterns with predictable bandwidth usage cycles, as shown in FIGS. 11 and 12. Moreover, the bulk transmission application is run on behalf of customers of these end-user ASs, and the administrators have incentive, financial or otherwise, to reveal information on bandwidth availability for bulk transmission. Furthermore, for the bulk transmission problem, the sender and receiver ASs are the invariants in the problem space. That is, bulk data has to be transmitted from a sender to a receiver, and these end-user ASs cannot be substituted. On the other hand, if transit ASs are the bottlenecks in the data transfer process, then it may be possible to purchase or lease more transit bandwidth. Therefore, instead of trying to collect information regarding the entire underlying flow network, it may be desirable to focus on the lesser task of collecting bandwidth data from only the sender AS and the receiver AS.

Also as described above, a second challenge corresponds to the complexity of the bulk routing techniques. The techniques make no assumption regarding the distribution of edge capacities. For bulk transmissions, the edge capacity has a wave distribution as shown in FIG. 22, and the wave distribution may simplify the routing protocols.

Bounded networks may be used to cheaply compute bounds for the objective functions described above, though the bounded flow network cannot be used for routing algorithms. In particular, a flow network constructed of only the sender AS and the receiver AS will bound the performance of the complete flow network. For flow network, N=(V, E, b), its bounded flow network is given by $N_{bn}$=({s, Tr,r}, {(s,Tr), (Tr,r)},b), where b(Tr,t)≥0 is the storage capacity of vertex Tr at t, b(s,Tr,t)=$\Sigma_{\forall(s,x)\in E}$b(s,x,t) and b(Tr,r,t)=$\Sigma_{\forall(x,r)\in E}$b(x,r,t), t=0, 1, 2, . . . , T, where 0≤T is the maximum allowable flow time from the sender vertex s to the receiver vertex r via the transit vertex Tr.

FIG. 25 shows a diagram of a bounded network that corresponds to a bounded version of the network shown in FIG. 23. The bounded network is formed from two cutsets, {b (s,x,t)∈E|t=0, 1, . . . , T} and {b(x,r,t)∈E|t=0, 1, . . . , T}. The maximum capacity of the network cannot exceed the capacity of the minimum of these cutsets. The bound cutsets are not necessarily the minimum cutset, since the minimum cutset can only be generated by evaluating the complete flow network. However, the sender and receiver cuts are invariant cutsets for bulk transmission. It is relatively simple to compute objective functions for the cutsets. For end-to-end, the flow is $f_{bn}(\lambda_e, T)=\Sigma_{t=0}^{T} \min\{b (s,Tr,t), b (Tr,r,t)\}$. For store-and-forward, the flow is $f_{bn}(\lambda_s,T)=\Sigma_{t=0}^{T}b(s,Tr,t)-f(Tr, T)$, where $f(Tr,T)$ is computed as:

$$f(Tr, T) = \begin{cases} \max\{0, f(Tr, t-1) + b(s, Tr, t) - b(Tr, r, t)\}, & \forall 0 < t \leq T \\ \max\{0, b(s, Tr, t) - b(Tr, r, t)\}, & t = 0 \end{cases}$$

For both end-to-end and store-and-forward approaches, $f(\lambda^{max},T) \leq f_{bn}(\lambda,T)$, and if $f(s,0^-)=f_{bn}(\lambda,\tau)=f(\lambda^*,t)$, then τ≤t. This result states that the maximal flow and universal maximal flow of a network is at most equal to the corresponding flow of its bounded network. If the sender or the receiver is the bottleneck, then the maximal flow and minimal time of the bounded network is equal to that computed by the objective functions. However, if the transit ASs are the bottleneck, then the bounded network generates an optimistic bound.

Another result that follows from the above analysis is that the optimal initiate time for the bounded network is the optimal initiate time for the corresponding flow network if either the outflow from s or the inflow to r is a bottleneck.

Thus, from a practical viewpoint, considering a bounded network is useful for multiple reasons. First, the solution of the bounded network has a constant complexity. Second, the input data for the bounded network underlying bulk transmission is typically obtainable. Third, the solution to the flow network is computationally complex and is NP-complete for universal maximal flow, so good-enough solutions are a cheap alternative. Furthermore, the bound can be used as an optimistic baseline for the "good-enough" solution. Fourth, choice of transit networks is more flexible than the end networks where the bulk transmissions originate. If required, more bandwidth can be leased or purchased from transit ISPs. In this case, the solution of the flow network is equal to the solution of its bound network. Fifth, when the transit ASs are the bottleneck, the bound solution can be used as a baseline to compute how much additional bandwidth should be leased or purchased from transit ASs in order to improve performance. Sixth, the bounded network can be used to find the optimal initiate time. Finding the optimal initiate time greatly simplifies the complexity of the final solution since one network has to be solved instead of T networks.

The systems and methods of the present disclosure provide a way to construct a favorable flow network that is simpler to solve than the full flow network. The favorable flow network is constructed using the sender AS, the receiver AS, and the storage nodes that are selected based on the respective time zones. The technique to find the maximal flow paths is simple because the favorable flow network includes a small number of nodes and links. Furthermore, the systems and methods described herein have identified that the time of initiation to start a desired data transfer is a key parameter to the performance of bulk transmission.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The invention claimed is:

1. A method for recommending a time to initiate a data transfer, comprising:
   storing a network map of a network;
   receiving input data regarding a desired data transfer, the input data including a sender identifier associated with a sender node in the network, a receiver identifier associated with a receiver node in the network, and a performance metric;
   determining, using the network map, the sender identifier, the receiver identifier, and the performance metric, a time for initiating the desired data transfer based at least in part on a diurnal sleep-wake cycle of users of the network in a time zone of the sender node; and
providing the determined time as a recommendation for initiating the data transfer.

2. The method of claim 1, wherein the determining comprises identifying a network path between the sender node and the receiver node and an availability profile of one or more intermediate nodes in the network path, the availability profile including a predicted bandwidth availability of the respective intermediate node as a function of time.

3. The method of claim 2, wherein the determining further comprises identifying a first time associated with a first bandwidth availability in the availability profile, identifying a second time associated with a second bandwidth availability larger than the first bandwidth availability, and selecting the second time.

4. The method of claim 1, further comprising:
identifying a plurality of network paths between the sender node and the receiver node;
recommending one of the plurality of network paths for the data transfer, the one of the plurality of network paths including at least one intermediate node for receiving data originating from the sender node, storing the data for a specified amount of time, and transmitting the data towards the receiver node.

5. The method of claim 4, further comprising evaluating, according to the performance metric, the plurality of network paths to obtain a score associated with each network path in the plurality of network paths, wherein the one of the plurality of network paths is associated with a score that exceeds a threshold.

6. The method of claim 1, wherein the determining is further based on the time zone of the sender node, the time zone of the receiver node, and a time difference between the sender node and the receiver node.

7. The method of claim 1, wherein the determining the time for initiating the desired data transfer comprises:
evaluating, according to the performance metric, a plurality of candidate initiate times to obtain a score associated with each candidate initiate time in the plurality of candidate initiate times; and
selecting a candidate initiate time that is associated with a score that exceeds a threshold.

8. The method of claim 7, wherein the score is determined from network availability profiles of the sender node, the receiver node, and a plurality of intermediate nodes that are on network paths between the sender node and the receiver node.

9. The method of claim 1, wherein the performance metric corresponds to an amount of active transfer time, an amount of end-to-end transfer time, or an amount of bandwidth availability, and the input data further includes a size of the desired data transfer.

10. The method of claim 1, wherein the determining the time comprises:
defining a bounded version of the network;
solving, using the bounded version of the network, an objective function of a flow network representative of one or more network paths between the sender node and the receiver node.

11. The method of claim 1, wherein determining the time for initiating the desired data transfer is further based at least in part on a diurnal sleep-wake cycle of users of the network in a time zone of the receiver node.

12. The method of claim 1, wherein determining the time for initiating the desired data transfer is further based at least in part on a diurnal sleep-wake cycle of users of the network in a time zone of an intermediate node on a network path between the sender node and the receiver node.

13. Modeling apparatus for recommending a time to initiate a data transfer, comprising:
memory storing a database configured to store a network map of a network;
a user interface configured to:
receive input data regarding a desired data transfer, the input data including a sender identifier associated with a sender node in the network, a receiver identifier associated with a receiver node in the network, and a performance metric; and
provide a time as a recommendation for initiating the data transfer; and
a performance optimizer device configured to determine, using the network map, the sender identifier, the receiver identifier, and the performance metric, the time for initiating the desired data transfer based at least in part on a diurnal sleep-wake cycle of users of the network in a time zone of the sender node.

14. The modeling apparatus of claim 13, wherein the performance optimizer device determines the time by identifying a network path between the sender node and the receiver node and an availability profile of one or more intermediate nodes in the network path, the availability profile including a predicted bandwidth availability of the respective intermediate node as a function of time.

15. The modeling apparatus of claim 14, wherein the performance optimizer device determines the time by identifying a first time associated with a first bandwidth availability in the availability profile, identifying a second time associated with a second bandwidth availability larger than the first bandwidth availability, and selecting the second time.

16. The modeling apparatus of claim 13, wherein the performance optimizer device is further configured to:
identify a plurality of network paths between the sender node and the receiver node; and
provide as a recommendation one of the plurality of network paths for the data transfer, the one of the plurality of network paths including at least one intermediate node for receiving data originating from the sender node, storing the data for a specified amount of time, and transmitting the data towards the receiver node.

17. The modeling apparatus of claim 16, wherein the performance optimizer device is further configured to evaluate, according to the performance metric, the plurality of network paths to obtain a score associated with each network path in the plurality of network paths, wherein the one of the plurality of network paths is associated with a score that exceeds a threshold.

18. The modeling apparatus of claim 13, wherein the performance optimizer device determines the time based on the time zone of the sender node, the time zone of the receiver node, and a time difference between the sender node and the receiver node.

19. The modeling apparatus of claim 13, wherein the performance optimizer device determines the time by:
evaluating, according to the performance metric, a plurality of candidate initiate times to obtain a score associated with each candidate initiate time in the plurality of candidate initiate times; and
selecting a candidate initiate time that is associated with a score that exceeds a threshold.

20. The modeling apparatus of claim 19, wherein the performance optimizer device determines the score from network availability profiles of the sender node, the receiver node, and a plurality of intermediate nodes that are on network paths between the sender node and the receiver node.

21. The modeling apparatus of claim 13, wherein the performance metric corresponds to an amount of active transfer time, an amount of end-to-end transfer time, or an amount of bandwidth availability, and the input data further includes a size of the desired data transfer.

22. The modeling apparatus of claim 13, wherein the performance optimizer device determines the time by:
defining a bounded version of the network;
solving, using the bounded version of the network, an objective function of a flow network representative of one or more network paths between the sender node and the receiver node.

23. The modeling apparatus of claim 13, wherein the performance optimizer device is configured to determine the time for initiating the desired data transfer based at least in part on a diurnal sleep-wake cycle of users of the network in a time zone of the receiver node.

24. The modeling apparatus of claim 13, wherein the performance optimizer device is configured to determine the time for initiating the desired data transfer based at least in part on a diurnal sleep-wake cycle of users of the network in a time zone of an intermediate node on a network path between the sender node and the receiver node.

25. A method for recommending a network path for a data transfer, comprising:
storing a network map of a network;
receiving input data regarding a desired data transfer, the input data including a sender identifier associated with a sender node in the network, a receiver identifier associated with a receiver node in the network, a size of the desired data transfer, and a performance metric;
identifying, using the network map, a plurality of candidate network paths between the sender node and the receiver node, each of the candidate network paths including at least one intermediate node for receiving data originating from the sender node and transmitting the data towards the receiver node;
assessing, according to the performance metric, a score associated with each respective candidate network path in the plurality of candidate network paths based at least in part on a diurnal sleep-wake cycle of users of the network in a time zone of the respective at least one intermediate node in the respective candidate network path; and
selecting one of the candidate network paths when the one of the candidate network paths is associated with a score that exceeds a threshold.

26. The method of claim 25, wherein:
a first candidate network path is associated with a first score representative of a first amount of transfer time;
a second candidate network path is associated with a second score representative of a second amount of transfer time; and
the first score is higher than the second score when the first amount of transfer time is shorter than the second amount of transfer time.

27. The method of claim 25, wherein the performance metric corresponds to an amount of active transfer time, an amount of end-to-end transfer time, or a combination of both an amount of active transfer time and an amount of end-to-end transfer time.

28. A method for assessing an amount of transferrable data between two nodes, comprising:
storing a network map of a network;
receiving input data regarding a desired data transfer, the input data including a sender identifier associated with a sender node in the network, a receiver identifier associated with a receiver node in the network, and a time interval;
identifying, using the network map, a plurality of network paths between the sender node and the receiver node, each of the network paths including at least one intermediate node for receiving data originating from the sender node and transmitting the data towards the receiver node;
assessing, for a respective network path in the plurality of network paths, an amount of data that can be transferred on the respective network path within the time interval based at least in part on a diurnal sleep-wake cycle of users of the network in a time zone of the at least one intermediate node in the respective network path; and
summing the assessed amounts of data to obtain an aggregate amount of data that can be transferred from the sender node to the receiver node within the time interval.

29. A method for transferring data, comprising:
receiving an initiation time for initiating a desired data transfer and a network path for executing the desired data transfer, the initiation time and the network path determined from a network map of a network, a sender identifier associated with a sender node in the network, a receiver identifier associated with a receiver node in the network, and a predicted availability of the sender node, the receiver node, or both the sender node and the receiver node, wherein the predicted availability is based at least in part on a diurnal sleep-wake cycle of users of the network in a time zone of the sender node, the receiver node, or both the sender node and the receiver node;
initiating, at the initiation time, the desired data transfer from the sender node to an intermediate node in the network path; and
storing, at the intermediate node, the data for a predetermined amount of time before transmitting the data from the intermediate node towards the receiver node along the network path.

30. Modeling apparatus for recommending a network path for a data transfer, comprising:
memory storing a database configured to store a network map of a network;
a user interface configured to receive input data regarding a desired data transfer, the input data including a sender identifier associated with a sender node in the network, a receiver identifier associated with a receiver node in the network, a size of the desired data transfer, and a performance metric; and
a performance optimizer device configured to:
identify, using the network map, a plurality of candidate network paths between the sender node and the receiver node, each of the candidate network paths including at least one intermediate node for receiving data originating from the sender node and transmitting the data towards the receiver node;
assess, according to the performance metric, a score associated with each respective candidate network path in the plurality of candidate network paths based at least in part on a diurnal sleep-wake cycle of users of the network in a time zone of the respective at least one intermediate node in the respective candidate network path; and select one of the candidate network paths when the one of the candidate network paths is associated with a score that exceeds a threshold.

31. The modeling apparatus of claim 30, wherein:

a first candidate network path is associated with a first score representative of a first amount of transfer time;

a second candidate network path is associated with a second score representative of a second amount of transfer time; and the first score is higher than the second score when the first amount of transfer time is shorter than the second amount of transfer time.

32. The modeling apparatus of claim 30, wherein the performance metric corresponds to an amount of active transfer time, an amount of end-to-end transfer time, or a combination of both an amount of active transfer time and an amount of end-to-end transfer time.

33. Modeling apparatus for assessing an amount of transferrable data between two nodes, comprising:

memory storing a database configured to store a network map of a network;

a user interface configured to receive input data regarding a desired data transfer, the input data including a sender identifier associated with a sender node in the network, a receiver identifier associated with a receiver node in the network, and a time interval; and a performance optimizer device configured to:

identify, using the network map, a plurality of network paths between the sender node and the receiver node, each of the network paths including at least one intermediate node for receiving data originating from the sender node and transmitting the data towards the receiver node;

assess, for a respective network path in the plurality of network paths, an amount of data that can be transferred on the respective network path within the time interval based at least in part on a diurnal sleep-wake cycle of users of the network in a time zone of the at least one intermediate node in the respective network path; and sum the assessed amounts of data to obtain an aggregate amount of data that can be transferred from the sender node to the receiver node within the time interval.

34. Modeling apparatus for transferring data configured to:

receive an initiation time for initiating a desired data transfer and a network path for executing the desired data transfer, the initiation time and the network path determined from a network map of a network, a sender identifier associated with a sender node in the network, a receiver identifier associated with a receiver node in the network, and a predicted availability of the sender node, the receiver node, or both the sender node and the receiver node, wherein the predicted availability is based at least in part on a diurnal sleep-wake cycle of users of the network in a time zone of the sender node, the receiver node, or both the sender node and the receiver node;

initiate, at the initiation time, the desired data transfer from the sender node to an intermediate node in the network path; and store, at the intermediate node, the data for a predetermined amount of time before transmitting the data from the intermediate node towards the receiver node along the network path.

* * * * *